United States Patent [19]

Park et al.

[11] 4,293,933

[45] Oct. 6, 1981

[54] WELL LOGGING APPARATUS AND METHOD: SYNTHETIC LOGS AND SYNTHETIC SEISMOGRAMS WITH EXTRAPOLATED REFLECTOR DIP FROM LOG MEASUREMENTS

[75] Inventors: Sung K. Park, Bethel; William E. Kenyon, Ridgefield, both of Conn.

[73] Assignee: Schlumberger Technology Corporation, New York, N.Y.

[21] Appl. No.: 558,832

[22] Filed: Mar. 17, 1975

[51] Int. Cl.³ ............................ G01V 1/32; G01V 1/40
[52] U.S. Cl. ........................................ 367/25; 364/422; 367/35; 367/73; 367/86; 73/152
[58] Field of Search ................. 73/152; 340/15.5 BH, 340/15.5 DP, 15.5 SS; 444/1; 324/1; 364/422; 367/25, 33, 35, 86, 73

[56] References Cited

U.S. PATENT DOCUMENTS

| | | | |
|---|---|---|---|
| 3,008,120 | 11/1961 | Hicks | 340/15.5 SS |
| 3,152,314 | 10/1964 | Mut | 340/15.5 SS |
| 3,241,102 | 3/1966 | Peterson | 340/15.5 SS |
| 3,466,532 | 9/1969 | Kolb | 324/1 |

OTHER PUBLICATIONS

"Interpretation of Velocity Spectra Through an Adaptive Modeling Strategy", Davis, *Geophysics*, vol. 37, No. 6, (Dec. 1972), pp. 953–962.

*Primary Examiner*—Howard A. Birmiel
*Attorney, Agent, or Firm*—Cooper, Dunham, Clark, Griffin & Moran

[57] ABSTRACT

A borehole investigating device takes measurements of a subsurface earth formation and provides signals forming sonic, formation density or similar logs of the borehole. Additionally, the investigating device measures the dip of seismic signal reflectors traversed by the borehole and provides corresponding dip signals. A seismic section which may or may not include the borehole is selected, and the log and dip signals are combined with signals defining the location of the seismic section with respect to the borehole, to thereby provide synthetic logs for each of a number of virtual boreholes which coincide with selected virtual and/or actual shotpoints of the seismic section. The synthetic log signals are then combined to form a truly two-dimensional synthetic seismogram for the selected seismic section. The synthetically derived signals may be corrected in accordance with a selected geological model of the formation.

46 Claims, 24 Drawing Figures

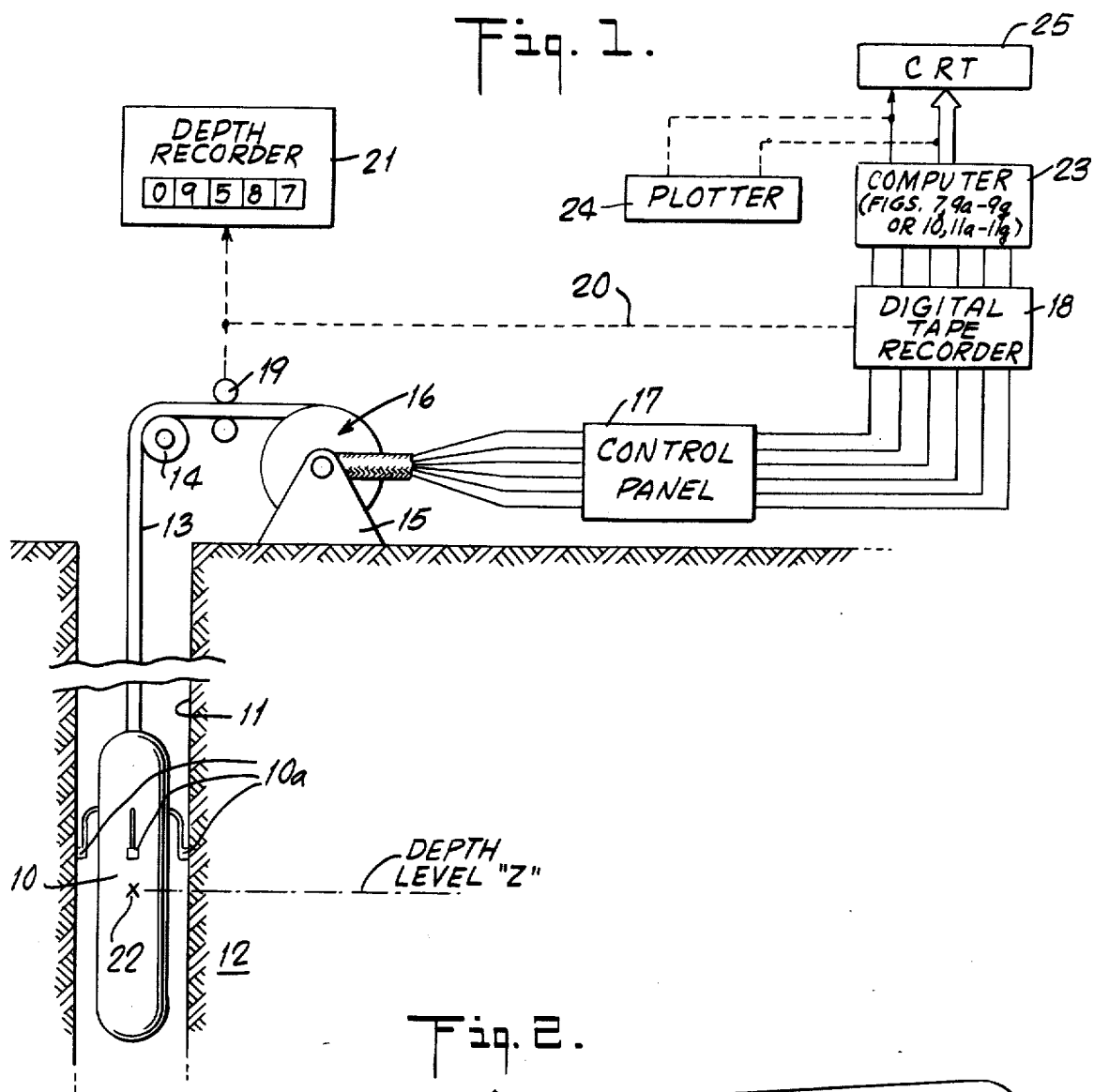
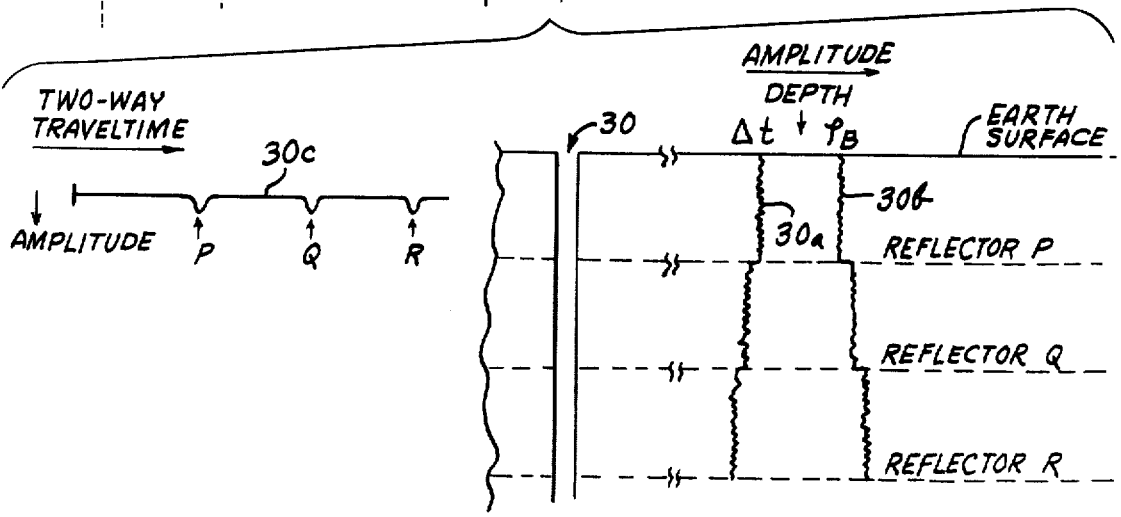

$L(n=1) = L(j=1) = L(m=1)$ $L(n=2) = L(j=2) = L(m=2)$ $L(n=3) = L(j=2) = L(m=2)$ $L(n=4) = L(j=3) = L(m=3)$ $L(n=5) = L(j=3) = L(m=3)$ $L(n=6) = L(j=6) = L(m=4)$ $L(n=7) = L(j=8) = L(m=5)$ $L(n=8) = L(j=8) = L(m=5)$ $L(n=9) = L(j=9) = L(m=6)$ $L(n=10) = L(j=12) = L(m=9)$ $L(n=11) = L(j=12) = L(m=9)$ $L(n=12) = L(j=12) = L(m=9)$ $L(n=13) = L(j=13) = L(m=10)$

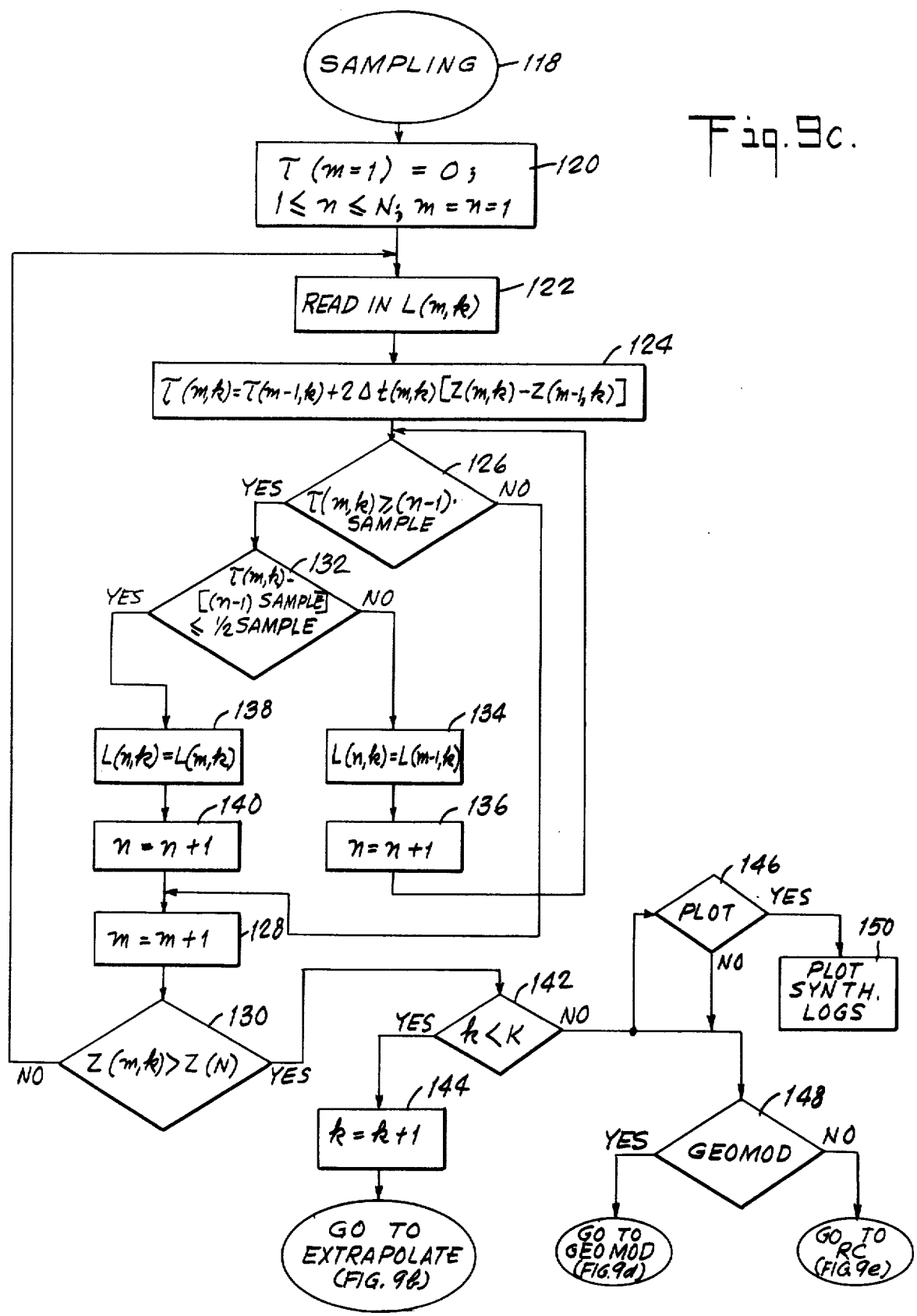

WELL LOGGING APPARATUS AND METHOD: SYNTHETIC LOGS AND SYNTHETIC SEISMOGRAMS WITH EXTRAPOLATED REFLECTOR DIP FROM LOG MEASUREMENTS

BACKGROUND OF THE INVENTION

The invention relates to exploring subsurface earth formations for valuable underground resources, and relates specifically to providing synthetic logs, synthetic seismograms and other signals synthetically derived from well logging measurements.

One major approach to exploring subsurface earth formations is seismic exploration, which involves detecting at the surface the reflections of downwardly propagating seismic signals from subsurface seismic reflectors. Typically, an input seismic signal is generated by exploding a dynamite charge at the bottom of a water-filled hole drilled through the weathered layer of the earth formation of interest. The input seismic signal propagates downwardly primarily as a congressional wave, and is partly refracted and partly reflected back toward the surface at each earth formation reflector (interface of two earth formation layers of different physical properties). The reflection of this compressional wave from the reflectors are detected at each of a plurality of geophones which are typically arranged along a line, although other than linear geophone arrays are often used. The detected reflections typically include primary reflections or simply primaries, when the detected wave has travelled along a generally V-shaped path—i.e. directly downwardly to a reflector and then directly upwardly to a geophone, and multiple reflections of simply multiples, when the detected wave has travelled along a generally W-shaped path at least once—i.e. downwardly to a reflector, then upwardly to another reflector, then again downwardly to a reflector, then again upwardly before reaching the geophone. The arrival times of the reflectons at the geophones are processed to compute, for each geophone, how long it would take for an imaginary input seismic signal originating at the geophone to go straight down to each underlying reflector and come straight back to the geophone as a primary reflection. These times are called the two-way traveltimes for a shotpoint at the geophone location, although in practice one could not have a shotpoint (e.g. a dynamite explosion) at the same point where one has a geophone. The arrival times are additionally processed to find the reflection coefficient of each reflector, where the reflection coefficient is a measure of the difference between the acoustic impedance of the two earth formation layers forming the reflector. Acoustic impedance is the product of the density of a layer and the velocity of a sound compressional wave propagating in it. A seismogram trace is then formed by plotting on a two-way traveltime scale the depth of each reflector (as defined by the two-way traveltime associated with it) and the reflection coefficient of that reflector. A number of such seismogram traces, one for each of a number of geophones detecting the same shot, form a seismogram, which typically has twenty-four traces. FIG. 12 illustrates the general shape of a seismogram, although the specific seismogram of FIG. 12 is synthetically derived in accordance with the invention. In FIG. 12, two-way traveltime increases downwardly, each of the vertical traces is a seismogram trace and each of the heavy dark areas of a trace denotes a reflection coefficient and therefore a reflector, with the size of the dark area corresponding to the value of the reflection coefficient. The vertical section of the earth formation which coincides with the line along which the geophones are arranged is called a seismic section. Thus, in FIG. 12 the plane of the figure is the plane of the seismic section and the rows of dark areas of the traces extending laterally across the figure denote reflectors intersected by the seismic section. Seismograms which are derived in this manner, by detecting reflections of sound compressional waves, are called natural seismograms in this specification to distinguish them from synthetic seismograms derived in other ways, as explained below.

Natural seismograms of this type provide a view of the major features of the earth formation traversed by the seismic section, but can not provide a detailed view thereof and are subject to many inaccuracies.

Another major approach to earth formation exploration involves well logging in a borehole drilled into the formation, and provides an accurate, microscopic look at the earth formation, but mainly for the portion adjacent the borehole. Since well logging provides signals which are generally more accurate than those typically provided in seismic exploration, various attempts have been made in the past to exploit this accuracy in enhancing natural seismograms. As one example, a well logging measurement called the continuous velocity log has been used to construct a corresponding laboratory model of a borehole. The model has been a physical structure whose acoustic impedance varies along its length in a manner analogous to the variation of acoustic impedance with depth in the earth formation where the continuous velocity log was obtained. For example, the model may be a metal rod of varying diameter, or a hollow tube whose cross-sectional area is varied by inserting plugs, or a rod whose velocity is varied by varying the temperature along its length. Transducers are fitted to one end of the model and are used to feed a simulated input seismic signal into the model and to pick up the reflections thereof from the levels in the model which represent reflectors.

The resulting reflections correspond to the two-way traveltimes discussed above for a single geophone and may be used, together with measured reflection coefficients, to construct a single seismogram trace. The trace is thus synthetically derived from well logging measurements. This synthetic seismogram trace may be compared with a natural seismogram for a seismic section which includes the borehole providing the continuous velocity log. The comparision may be made by appropriately scaling the synthetic seismogram trace and the natural seismogram so they are to the same scale, overlaying the synthetic seismogram trace on the natural seismogram over the corresponding (in location) natural seismogram trace, and noting the differences, if any. The natural seismogram may then be corrected in accordance with the synthetic seismogram trace, which may be assumed to be more accurate since it results from inherently more accurate well logging measurements.

As another example of using well logging measurements to construct a synthetic seismogram trace, the continuous velocity log is replotted as a variable area log, and the depth scale is changed to a two-way traveltime scale. This variable area log is drawn past a photocell circuit which gives a single pulse for each significant change in the plotted variable area log. These pulses are passed through a pulse shaping unit whose characteristics are such that a single pulse input provides an output whose waveform is that of a corresponding seismic signal reflection. The output of this unit thus corresponds to the seismic reflection which would be detected for a shotpoint coinciding with the borehole from which the continuous velocity log is derived, and this is passed through a normal seismic amplifier and recorder. The output is usually recorded on two or more channels to increase the resemblance of the resulting synthetic seismic traces to a natural seismogram, which typically has 24 traces. Corresponding synthetic and natural seismogram traces may then be compared to help make the natural seismogram more accurate, or to help interpret the natural seismogram.

As still another example, digital computers have been used to read a continuous velocity log at discrete, equal time intervals and to then calculate corresponding reflection coefficients at each of the points taken, by supposing that there is a reflector at each point in the borehole where a log measurement is taken. These reflection coefficients (possibly including the effects of multiples) are then convolved with the waveform of a selected imaginary input seismic signal. The resulting waveforms are sampled at the same time intervals as the continuous velocity log. The output can then be plotted to give a single synthetic seismogram trace of the type discussed above, which may be used for the same purposes. See: Geophysical Prospecting, Vol. 8, No. 2, p. 231 (1960); Oil and Gas Journal, Nov. 4, 1974, p. 56. See also U.S. Pat. Nos.: 3,008,120; 3,108,250; 3,142,750; and 3,241,102.

These prior art synthetic seismograms are one-dimensional, in the sense that they simulate the seismogram trace for a single shotpoint which coincides with the borehole from which the logs are derived. When a prior art synthetic seismogram is compared with a natural seismogram, the synthetic seismogram corresponds only to a single trace of the natural seismogram, this single trace being for the shotpoint that coincides with the borehole from which the logs are derived. If the seismic section of interest does not coincide with the borehole, then there is no clear correspondence between the prior art synthetic seismogram trace derived from logging measurements and the natural seismogram for the selected seismic section, because generally there is no trace of the natural seismogram which should be the same as the synthetically derived trace. This is so because most real-life earth formations include reflectors which are not horizontal, but dip with respect to a horizontal plane, and any two seismogram traces for such formation would differ since they are for shotpoints at vertical lines which intersect such dipping reflectors at diffeent depths.

Thus, the prior art techniques for generating a synthetic seismogram trace have been limited to producing traces for shotpoints coinciding only with an actual borehole. It has not been possible with such prior art techniques, therefore, to provide truly two-dimensional seismograms, that is accurate synthetic seismogram traces for shotpoints removed along the surface from an actual borehole. If such truly two-dimensional synthetic seismograms could be produced, they would provide a view of the investigated formation comparable to or better than the view that can be provided by the inherently two-dimensional natural seismograms, since they are based on the more accurate well logging measurements.

The term synthetic seismogram has been sometimes used in a different context: it has been applied to the end product of a process which involves arbitrarily selecting a laboratory geological model of an earth formation, that is, defining arbitrarily the location and reflection coefficient of each reflector of an arbitrary formation, and then constructing a synthetic seismogram which would correspond to the arbitrarily selected laboratory model. This, however, does not involve the direct use of logs derived from a borehole traversing the earth formation which is of interest, and thus does not benefit from the inherent accuracy of well logging measurements.

SUMMARY OF THE INVENTION

The invention relates to exploring subsurface earth formations for valuable underground resources such as hydrocarbons, and specifically relates to using log and dip measurements derived from an investigating device passed through a borehole traversing the earth formation to explore parts of the formation that may be removed from the borehole by substantial distances.

In a specific embodiment of the invention, log and dop signals are provided which are derived from an investigating device passed through a borehole traversing an earth formation. Additionally, location signals are provided which define the spatial relationship between the borehole and each of a number of arbitrarily selected shotpoints which define a selected seismic section of the earth formation. The log, dip and location signals are combined to provide (1) one or more synthetic logs for each of a plurality of virtual boreholes coinciding with the shotpoints, i.e. the logs which would have been measured in a borehole at each of the selected shotpoints, and/or (2) synthetic reflection signals defining the reflection coefficients of reflectors traversed by each of said virtual boreholes, and/or (3) a synthetic seismogram of the selected seismic section.

In a more specific embodiment of the invention, one or more borehole investigating devices are passed through an actual borehole in the earth formation of interest to derive thereby log signal sets $L(i)$ and dip signal sets $Dip(j)$.

Each log signal set $L(i)$ comprises: a depth value signal $Z(i)$ which is the depth of the top boundary of a thin (e.g. six-inch thick) layer (i), where (i) is a positive integer ranging in value from $i=1$ at the surface to $i=I$ at the bottom of the borehole; and one or more log value signals characterizing the layer (i)—e.g. the sonic log value signal $\Delta t(i)$ and the formation density log value $\rho_B(i)$ of the layer (i), where the sonic log value $\Delta t(i)$ is the so-called interval transit time and is the time in microseconds required for a compressional sound wave to traverse one foot of a formation which has the same properties as that of the layer (i) and the formation density log value $\rho_B(i)$ is the density in grams/cm$^3$ of the formation of the layer (i). The log signal sets $L(i)$ are converted to log signal sets $L(j)$ each comprising a depth value signal $Z(j)$, which is the depth in the actual borehole of the top boundary of layer (j), and one or more log value signals characterizing the layer (j), e.g. a sonic log value signal $\Delta t(j)$ and a formation density log value signal $\rho_B(j)$. Here (j) is an integer starting with 1 at the top of the actual borehole. The thickness of each layer (j) is the thickness through which a compressional sound wave would propagate vertically from depth $Z(j)$ in a unit two-way traveltime of time called SAMPLE in this specification. If SAMPLE is 1.234569 milliseconds, then each layer (j) is about six feet thick, but may be more or less than that, depending on the nature of the earth formation at the depth Z(j), which determines the speed of the compressional sound wave at that depth.

Each dip signal set D(j) defines the orientation of the layer (j) and comprises a dip value signal $\theta$(j) which gives in degrees the angle between a vertical line and a vector normal to the plane of the top boundary of the layer (j). Note that while this top boundary is referred to in this specification as a reflector (j) having an acoustic impedance u(j), it should be clear that it could be a reflector whose reflection coefficient R(j) is zero, i.e. it could be simply a plane with identical earth formation layers on both sides thereof. Additionally, each set D(j) includes an azimuth value signal $\phi$(j) which gives in degrees the angle measured clockwise from true North to the projection on a horizontal plane of the same normal vector of the reflector (j), and still additionally includes a seismic section azimith signal $\phi'$, which is the angle in degrees measured clockwise from North to the selected seismic section.

A seismic section is selected by selecting a plurality of K virtual shotpoints along the surface and defining that there is a virtual borehole (k) extending straight down from each virtual shotpoint, with the K virtual boreholes defining the plane of the selected seismic section. The distances X(k) between the actual borehole and each of the K virtual shotpoints (k) are known or can be measured, and these distances are referred to in this specification as location signals which define the spatial relationship between the actual borehole and the virtual borehole. The sets L(i) and Dip(j) and the location signals X(k) are combined in accordance with the invention to derive for each of the K virtual boreholes a plurality of log value sets L(m,k). Each log value set L(m,k) comprises a depth value signal Z(m,k) which defines the depth in the virtual borehole (k) of the top boundary of a layer (m), and log value signals, e.g. sonic and formation density, for the same layer (m), where (m) is an integer subscript starting at m=1 at the top of the virtual borehole (k) and ending at m=M at the bottom. The log value sets L(m,k) are derived by projecting to each virtual borehole each reflector which traverses the actual borehole and has a nonzero reflection coefficient. Each such reflector intersects the virtual borehole (k) at a depth Z(m,k), and the layer (m) in the virtual borehole (k), which extends from the depth Z(m,k) to the depth Z(m+1,k) where the next such reflector intersects the virtual borehole, is given the log value signals for the corresponding layer of the actual borehole. In the practice of this invention, it is assumed that where it is not known with certainty which of two or more reflectors of nonzero reflection coefficient would determine the properties of a given point in a given virtual borehole, it is assumed that the topmost one of said reflectors dominates. The log value sets L(m,k) are for layers (m) which are of irregular thickness, and these log value sets L(m,k) are converted to log value sets L(n,k) defining layers (n) in each virtual borehole (k), which layers (n) are arranged with the same regularity as the layers (j) in the actual borehole, i.e. each layer (n) has a top boundary which is at depth Z(n,k) and has the thickness through which a sound compressional wave propagates straight down from the depth Z(n,k) in a unit of time called SAMPLE. Each log value set L(n,k) this includes a depth value signal Z(n,k) defining the depth of its top boundary and log value signals, e.g. for sonic and formation density logs, which are determined by the log value signals from a log value set L(m,k) which is selected in accordance with the invention, as explained in detail below. Again, (n) is an integer subscript ranging in value from n=1 at the top and n=N at the bottom of the virtual borehole (k). The log value sets L(n,k) are combined to derive a signal u(n,k) which defines the acoustic impedance of the layer (n) in the virtual borehole (k), where acoustic impedance is the ratio between the formation density log value and the sonic log (interval transit time) value for the layer (n). The determined acoustic impedance values u(n,k) are combined to derive for each reflector (n) a reflection coefficient R(n,k). Again, each reflector (n) is simply the plane at the top boundary of the layer (n) in the virtual borehole (k), and may be between two layers (n) of the same acoustic impedance, in which case it will have a zero reflection coefficient, or may be between two layers (n) of different acoustic impedance, in which case it will have a nonzero reflection coefficient. The reflection coefficients R(n,k) may be any one or more of: (1) the ideal reflection coefficient r(n,k); (2) the true amplitude reflection coefficient r'(n,k); and (3) the amplitude restored reflection coefficient r''(n,k). The ideal reflection coefficient r(n,k) is the reflection coefficient which would be measured for a reflector in a formation where there is perfect elasticity and hence no amplitude loss for a sound compressional wave traveling therein and where there are no transmission losses, i.e. a sound compressional wave traversing a reflector does not lose any of its energy. The true amplitude reflection coefficient r'(n,k) is the reflection coefficient which would be measured for a reflector that is in a real-life earth formation, i.e. it is a reflection coefficient which would be measured for a reflector in an earth formation which has both lack of perfect elasticity, so that a sound compressional wave loses some of its energy in simply traveling through the formation between reflectors therein, and which has transmission losses, so that a sound compressional wave loses some of its energy in traversing a reflector. The amplitude restored reflection coefficient r''(n,k) is for a reflector in an earth formation whose properties are not exactly known, so it is not possible to determine exactly the true amplitude reflection coefficients, but where some assumptions may be made as to the attenuation and transmission loss of a sound compressional wave traveling therein, so that some compensation can be made for such attenuation and transmission losses. Finally, the reflection coefficients R(n,k) are convolved with a signal S(q) which defines an input seismic signal to thereby simulate the interaction between the input seismic signal provided by a source such as a dynamite explosion and the earth formation reflectors which occur when natural seismograms are derived. The result of convolving the reflection coefficients R(n,k) for a given virtual borehole (k) and the input seismic signal S(q) is a signal f(n,k) which defines a synthetic seismogram trace corresponding to the shotpoint at that virtual borehole. The resulting plurality of K such synthetic seismic traces forms a synthetic seismogram.

Since the dip of the earth formation reflectors traversing the actual borehole is measured and taken into account when deriving a synthetic seismogram in accordance with the invention, this synthetic seismogram is truly two-dimensional, in the same sense as a natural seismorgram of a two-dimensional seismic section, and clearly shows reflector dip. Furthermore, since the seismic section for which a synthetic seismogram is derived in accordance with the invention need not coincide with any actual borehole, a synthetic seismogram can be derived for exactly the same seismic section for which a natural seismogram has been derived, to thereby compare the synthetic and natural seismogram and enhance the interpretation thereof as well as correct the natural seismogram.

If a geological model of the formation under investigation is available, any of several different signals derived in accordance with the invention may be conformed to such geological model. Furthermore, while it is generally assumed in this specification that the actual borehole is vertical, the well logging measurements derived from a non-vertical borehole may be corrected in accordance with known techniques to convert them to the measurements which would have been obtained from a vertical borehole starting at the same surface point. Additionally, a check-shot may be fired at one or more selected points adjacent the actual borehole and the overall transit time of a sound compressional wave measured thereby may be used to correct proportionately the sonic log signals derived from the borehole or two-way traveltimes computed as described below.

BRIEF DESCRIPTION OF THE DRAWINGS

FIG. 1 is a generalized schematic illustration of a system incorporating the invention.

FIG. 2 is a schematic illustration of: a subsurface earth formation having only horizontal reflectors, typical logs derived from an investigating device passed through a borehole traversing the formation and a typical seismogram trace.

FIGS. 9a through 9g are detailed flowcharts illustrating said one embodiment of the invention.

DETAILED DESCRIPTION

Figure 3:
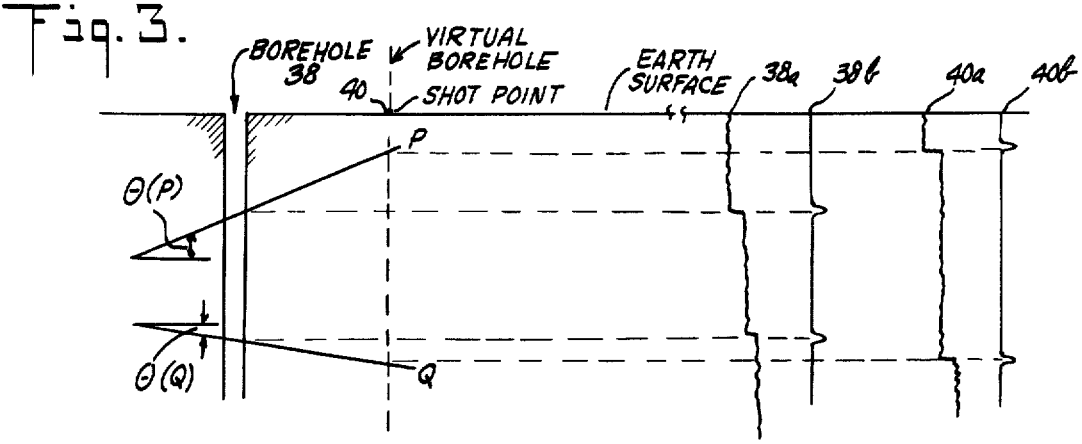
FIG. 3 is a schematic illustration of an actual borehole transvering an earth formation with dipping reflectors and a virtual shotpoint coinciding with a virtual borehole traversing the earth formation.

Referring to FIG. 1, an investigating device 10 is lowered in a borehole 11 for investigating the subsurface earth formation 12. The investigating device 10 is supported in the borehole 11 at the end of a cable 13 which passes over a sheave wheel 14 and is secured to a drum and winch mechanism 15. The mechanism 15 includes a suitable brush and slip ring arrangement 16 for providing electrical connections between the conductors forming a part of the cable 13 and a control panel 17. The control panel 17 provides power and control signals to the investigating device 10 and includes suitable electronic circuitry for receiving well logging measurements (typically in the form of analog electrical signals) from the investigating device 10 and readying such measurements for application to a digital tape recorder 18.

The tape recorder 18 converts the analog signals received from the control panel 17 into digital signals and is stepped as a function of depth by a driving wheel 19 engaging the cable 13 and a mechanical linkage 20. The digital signals are then either transmitted or carried to a computer 23 for combining in accordance with the invention. The output of the computer 23 is used to drive a plotter 24 or to provide real time display by driving a cathode ray display system 25.

The investigating device 10 includes a dipmeter having pads 10a mounted on hydraulically actuated arms to provide dip signals which define the seismic signal reflectors traversed by the borehole 11. Dipmeters of this type and the measurements provided thereby are discussed in Fundamentals of Dipmeter Interpretations, Schlumberger Ltd., 1970. Additionally, the investigating device 10 includes tools for sonic and formation density logging or for other types of logging. Tools of this type and the measurements provided thereby are discussed in detail in Log Interpretation Principles, Schlumberger Ltd., 1969.

Referring to FIG. 2, suppose an earth formation which has the perfectly horizontal reflectors P, Q, and R is traversed by a perfectly vertical borehole 30. Suppose that the investigating device 10 has derived (by one or more passes through the borehole 30) sonic log interval transit time signals $\Delta t$ and formation density log signals $\rho_B$ which are as illustrated at 30a and 30b respectively. Using the prior art techniques described above, a synthetic seismogram trace 30c can be derived from the log signals shown at 30a and 30b, where the three peaks on the trace 30c correspond to the three reflectors P, Q, and R as shown. Note that the synthetic seismogram trace 30c is plotted on a two-way traveltime scale and hence the distance along the trace between two adjacent peaks is determined both by the thickness of the corresponding layer and by the sonic velocity (the inverse of $\Delta t$) in the layer. Hence, if in FIG. 2 the sonic velocity increases with depth, the distance between the peaks of the synthetic seismogram trace 30c decreases with two-way traveltime.

In the idealized earth formation shown in FIG. 2, where the actual borehole is perfectly vertical and the surface and the reflectors are perfectly horizontal, the synthetic seismogram trace 30c could be correct for any arbitrarily chosen shotpoint on the surface. In real life however, earth formations generally do not have reflectors which are perfectly horizontal and perfectly parallel to the surface, but do have reflectors which dip at various individual angles with respect to a horizontal plane.

Referring to FIG. 3 for a simple example, the formation traversed by the borehole 38 includes a wedge-shaped layer between the surface and a dipping reflector P and another wedge-shaped layer between the dipping reflector P and another dipping reflector Q. In the formation shown in FIG. 3, one or more logs, e.g. the log shown at 38a, may be derived by one or more passes of a borehole investigating device, and such logs may be converted by prior art techniques to a synthetic seismogram trace 38b. (Note that the log 38a is along a depth scale while the synthetic seismogram trace 38b is along a two-way traveltime scale.) However, the synthetic seismogram trace 38b would not be correct for a shotpoint at 40, where there is no borehole, because of the dip of the reflectors P and Q. Assuming that a borehole could be drilled straight down at point 40, and suitable logs 40a could be derived and converted to a synthetic seismogram trace 40b by prior art techniques, it is clearly seen that the synthetic seismogram traces 38b and 40b would not be identical, and that the synthetic seismogram 38b is accurate only for a shotpoint coinciding with the actual borehole 38. Thus, the synthetic seismogram traces derived by prior art techniques can not be extended to form a truly two-dimensional synthetic seismogram to correspond to the inherently two-dimensional natural seismograms, in contrast with the invention described herein, where the resulting synthetic seismograms are truly two-dimensional, in the same sense as the two-dimensional natural seismograms.

Figure 4:
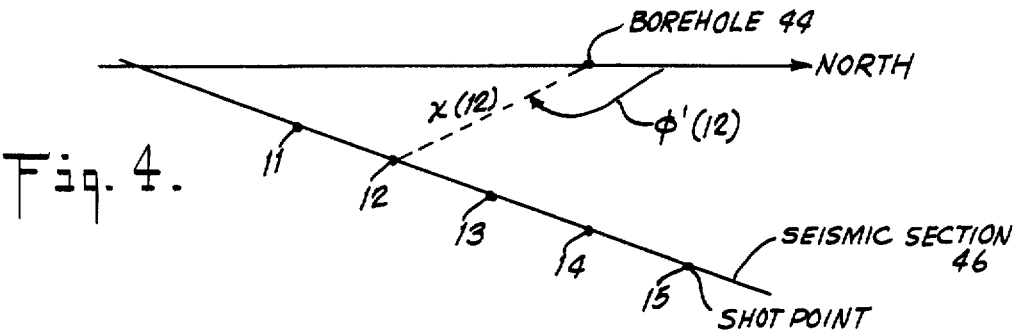
FIG. 4 illustrates the spatial relationship between a borehole and the line of a seismic section traversing an earth formation.

For example, referring to FIG. 4 which shows a top view of an earth formation having dipping reflectors and traversed by an actual borehole 44, an accurate synthetic seismogram trace can be derived by prior art techniques only for a shotpoint coinciding with the actual borehole 44, but not for any other shotpoint. In contrast, a synthetic seismogram trace can be obtained in accordance with the invention herein for any shotpoint, including shotpoints spaced along the surface from the actual borehole 44, and such synthetic seismogram traces can form a synthetic seismogram for any selected seismic section of that formation. For example, synthetic seismogram traces can be derived in accordance with the invention for each of the virtual shotpoints 46-11 through 46-15, and these synthetic seismogram traces would define a synthetic seismogram for the seismic section 46.

Figure 5:
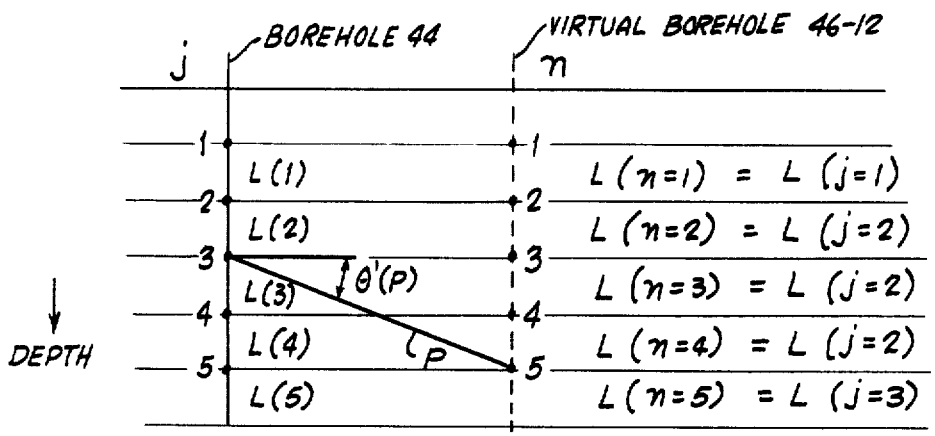
FIG. 5 illustrates the relationship between an actual borehole and a virtual borehole and between the log value sets for the actual borehole and the synthetic log value sets for the virtual borehole.

Referring to FIG. 5, assume that the borehole 44 is vertical and the plane of FIG. 5 includes the borehole 44 and the shotpoints 46-12 on the seismic section line 46, and suppose that there is a virtual borehole at 46-12 and that the plane of FIG. 5 intersects a dipping reflector P as illustrated. In accordance with the invention, accurate synthetic logs for the virtual borehole at 46-12 and an accurate synthetic seismogram trace for the shotpoint at 46-12 can be derived from log and dip measurements made only in the actual borehole 44. Specifically, suppose that the previously defined log value sets L(j) are provided for each of the layers j=1 through j=5 of the actual borehole 44 and suppose that there are corresponding layers n=1 through n=5 at the virtual borehole 46-12 for which the previously defined log value sets L(n) are to be derived in accordance with the invention. It is clear from the illustration that it would be accurate to assign to each of the layers from n=1 through n=4 log value sets derived by the investigating device in the actual borehole 44 for either of the layers at j=1 or j=2, and that it would be accurate to assign to the layer at n=5 the log value set measured at any of the layers at j=3 through j=5 in the actual borehole 44. In accordance with the invention, the general rules are: (1) if two correspondingly numbered layers (j) and (n) are between the same reflectors (or between the surface and the same reflector), the log value set measured for the (j) layer is given to the correspondingly numbered (n) layer (e.g. the layers at j=n=1); if a correspondingly numbered (j) layer and (n) layer are separated by a reflector (e.g. at j=n=3) the log value set for the last (j) layer above the reflector is given to the (n) layer. In the case of reflectors which intersect each other prior to intersecting a virtual borehole, more detailed rules are discussed in connection with FIG. 8.

In order to provide synthetic logs of this type for virtual boreholes in accordance with the invention, it is necessary to know the location of each virtual borehole with respect to the actual borehole, and it is necessary to know the location of each reflector which traverses the actual borehole.

Figure 6:
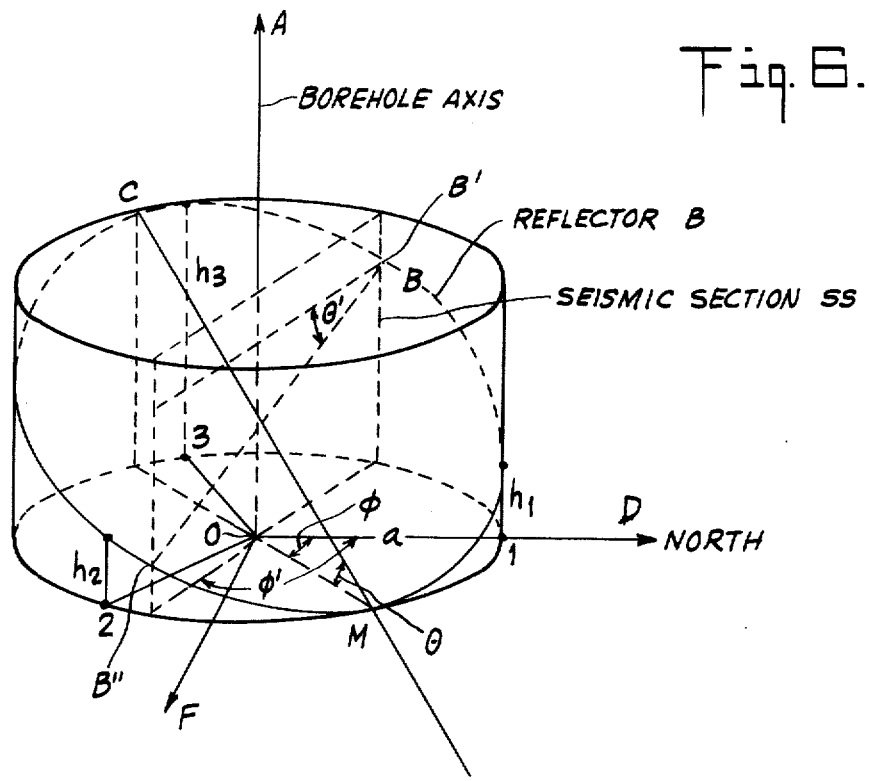
FIG. 6 illustrates the relationship between a borehole and the plane of a reflector traversed by the borehole.

Referring to FIG. 6 for a more detailed understanding of the geometry involved, a section of a cylindrical borehole is traversed by a reflector plane B. The borehole axis A is vertical and a plane DOF is horizontal. Point O is on the borehole axis A, and OD denotes the North direction. A plane down perpendicular to the reflector B through axis OA cuts the reflector B along its apparent line of greatest slope, and cuts the horizontal plane DOF through a line OM. The angle OMC is the dip angle $\theta$ of the reflector B and the angle DOM is the azimuth angle $\phi$ thereof, measured positive clockwise from D to M. There is a seismic section SS in a vertical plane which may or may not coincide with the borehole axis OA. The seismic section SS intersects the reflector B at a line B'B'' whose angle $\theta'$ with respect to the horizontal is the apparent dip of the reflector B with respect to the seismic section SS. The angle $\phi'$ of the seismic section from the North direction is the azimuth of the seismic section.

Referring to FIGS. 4, 5, and 6, the depth Z(P,k) at which a reflector P traverses a virtual borehole (k) spaced from the actual borehole by a distance X(k) is related to the depth Z(P) at which the same reflector traverses the actual borehole as follows:

$$Z(P,k) = Z(P) + X(k) \tan \theta \, [\cos(\phi - \phi')] \tag{1}$$

wherein k=1,2,3, ... K, and there are a total of K virtual boreholes.

If the formation density $\rho_B(n,k)$ and the sonic log interval transit time $\Delta t(n,k)$ are known for each layer (n) of a borehole (k), then the acoustic impedance u(n,k) for that point and the ideal reflection coefficient r(n,k) for the same point are as follows:

$$u(n,k) = \rho_B(n,k)/\Delta t(n,k) \tag{2}$$

where n=1,2,3, ... N.

$$r(n,k) = [u(n,k) - u(n-1,k)]/[u(n,k) + u(n-1,k)] \tag{3}$$

In order to take into account the attenuation and transmission loss of a sound compressional wave propagating through an earth formation and traversing reflectors, a true amplitude reflection coefficient r'(n,k) for a layer (n) of virtual borehole (k) can be found in accordance with the invention through the following expression:

$$r'(n,k) = r(n,k) \prod_{s=2}^{n} \{1 - [r(s-1,k)]^2\} \tag{4}$$

where: r'(1,k) = r(1,k);

$$\prod_{n=p}^{N} A(n) = A(p) \cdot A(p+1) \cdot A(p+2) \cdot \ldots \cdot A(N-1) \cdot A(N);$$

and p and s are positive intergers.

Figure 12:
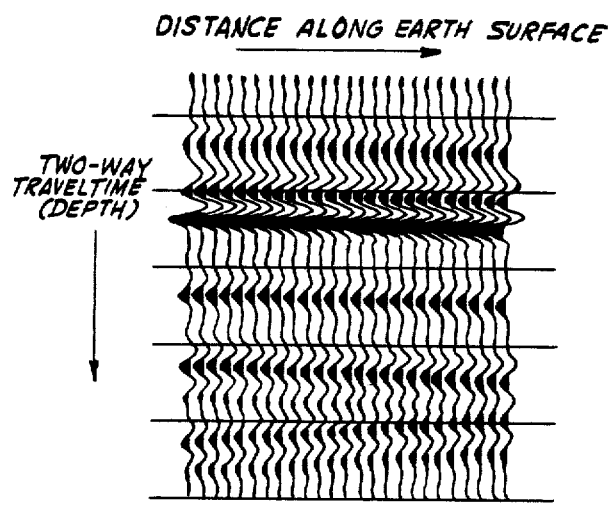
FIG. 12 illustrates an example of a synthetic seismogram derived in accordance with the invention.

A synthetic seismogram trace can be generated in accordance with the invention from the reflection coefficients r(n,k) or r'(n,k) for each of a selected plurality of virtual boreholes (k), to form thereby a composite of such traces, this composite being a synthetic seismogram for a seismic section defined by the plane including the virtual boreholes. A portion of a synthetic seismogram derived in accordance with the invention is illustrated in FIG. 12, where two-way traveltime increases downwardly, amplitude is denoted by heaviness of the trace and each of the vertical traces is for a single virtual shotpoint.

If the synthetic seismogram is derived from the ideal reflection coefficients r(n,k) found in accordance with expression (3), then the synthetic seismogram represents the theoretical response of an earth formation in which there are no attenuation or transmission losses of a sound compressional wave, and the resolution and amplitude of a seismogram trace are the same at any depth. If the reflection coefficients r'(n,k) found in accordance with expression (4) are used, then the resulting synthetic seismogram simulates a natural seismogram whose amplitude has not been restored, i.e. a seismogram in which no compensations have been made for the attenuation and transmission losses a sound compressional wave encounters as it moves through the formation and traverses reflectors.

Usually, in actual seismic surveys the attenuation and transmission loss functions of the specific earth formation which is being investigated are not known accurately, and it is not generally possible to accurately simulate a natural seismogram with unrestored amplitude. In order therefore to simulate a more practical amplitude restoration, an amplitude restored reflection coefficient r''(n,k) can be found in accordance with the invention through the following expression:

$$r''(n,k) = r'(n,k)\gamma(n,k) \tag{5}$$

where: $\gamma$ is an arbitrarily selected gain function given by:

$$\gamma(n,k) = \{1 + a[(1/Ta) - 1]\}^{n-1}$$

and Ta is given by:

$$Ta^{N-1} = \sqrt{\prod_{n=2}^{N} \{1 - [r(n-1,k)]^2\}}$$

In the above expression (5), N is the number of the deepest layer of the earth formation which is traversed by the borehole (k) and a is an amplitude restoration factor and has a value selected to be between 0 and 1. When the selected value of a approaches 1, the resulting synthetic seismogram simulates the case for average restoration close to 100%, and thus approaches the seismogram which would result from ideal reflection coefficients r(n,k), and when a approaches 0 the resulting synthetic seismogram simulates the case where there is almost no amplitude restoration, i.e. the case of the seismogram which would result from the true amplitude reflection coefficients r'(n,k).

When the ideal reflection coefficients r(n,k) are chosen, the resulting synthetic seismogram allows viewing clearly the formation parts which are so deep that they would not show clearly on a corresponding natural seismogram which has not been restored. When the true amplitude reflection coefficients r'(n,k) are used, the resulting synthetic seismogram most closely simulates a natural seismogram which has not been restored, and allows viewing most clearly the formation closest to the surface. When the amplitude restored reflection coefficients r''(n,k) are chosen, the resulting synthetic seismogram can be anywhere in the range between the synthetic seismograms resulting from r(n,k) and r'(n,k), depending on the choice of the constant a in expression (5) above.

To provide a synthetic seismogram trace in accordance with the invention, the reflection coefficients r, r' or r'' are convolved with a selected waveform of an input seismic signal S(q). Where the reflection coefficient is R(n,k), the seismogram trace signal f(n,k) is related to the input seismic signal S(q) in accordance with the invention as follows:

$$f(n,k) = \sum_{q=1}^{Q} S(q) \cdot R(n-q,k) \tag{6}$$

where R(n,k) = {r(n,k), r'(n,k), r''(n,k)}; and q is time.

The input seismic signal S(q) is the input waveform which simulates a selected seismic signal source. It is a type of a so-called Ricker wavelet, and is given in accordance with the invention by the following:

$$S(q) = e^{-\frac{1}{2}(4f_0 q - 3f_0)^2} \cos 2\pi(f_0 q - \frac{3}{4}) \tag{7}$$

where: q is time, and $f_o$ is a constant and is generally chosen within the range of 10 to 60 (lower range simulates a longer wavelength input seismic signal and vice versa), depending on the desired resolution of the synthetic seismogram (longer wavelength means lower resolution and vice versa).

Figure 8:
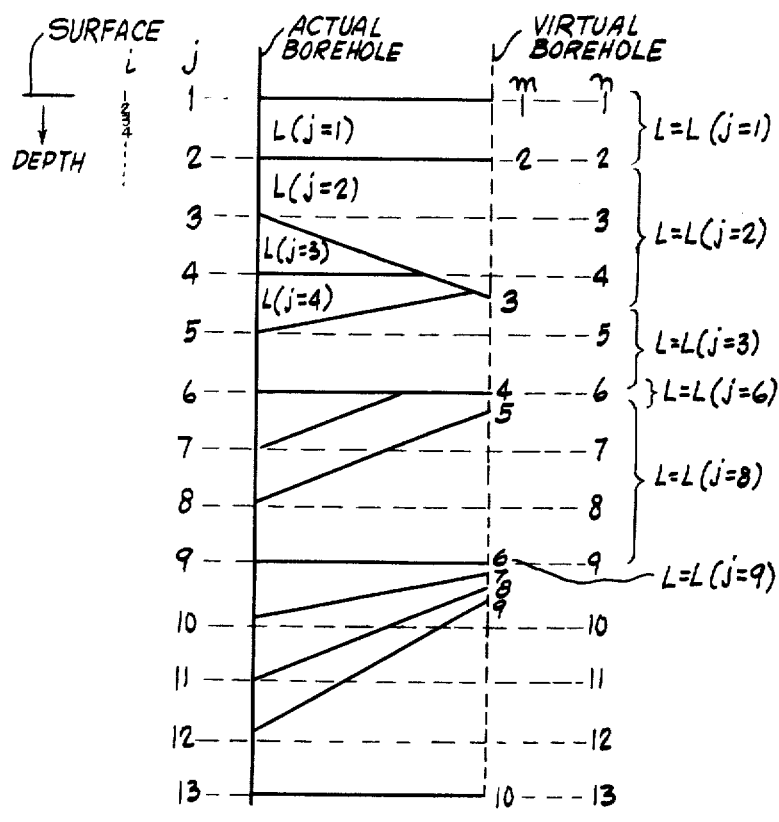
FIG. 8 illustrates the relationship between the log value sets for an actual borehole and a virtual borehole traversed by dipping reflectors.
Figure 7:
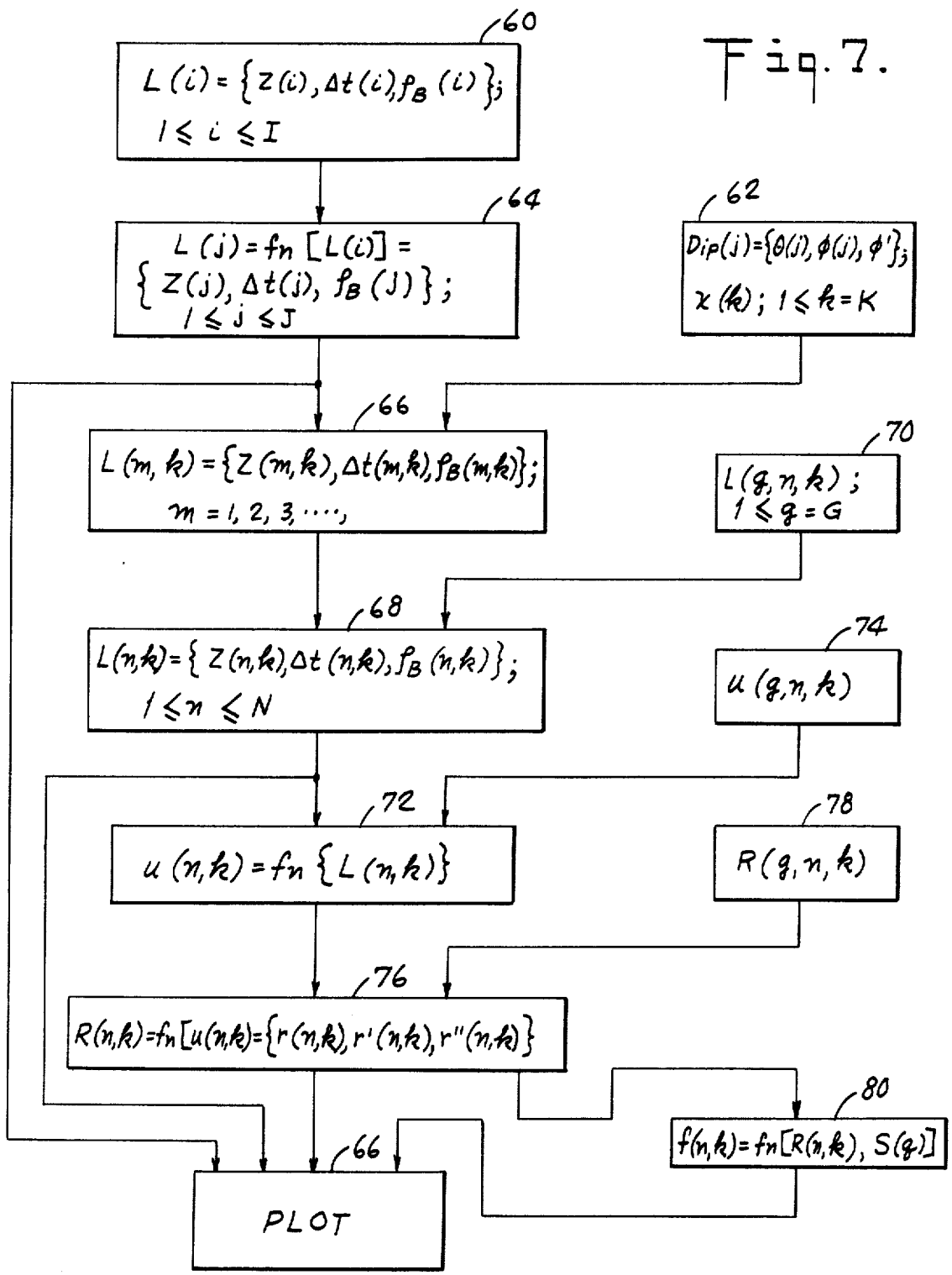
FIG. 7 is a generalized flowchart illustrating one embodiment of the invention.

Referring to FIGS. 7 and 8 for a brief illustration of the principles of the invention, the invented process starts with measurements taken in a borehole with a borehole investigating device and comprising selected log measurements and dip measurements. Referring to 60 at FIG. 7, L(i) denotes the set of log values corresponding to a depth point Z(i) in the actual borehole, where (i) is an integer ranging in value from 1 to I. If measurements are taken every six inches in a borehole, then L(1) is the log value set for the topmost six-inch layer, L(2) is the log value set for the next six-inch layer, etc. Each log value set L(i) comprises, in the exemplary embodiment of the invention discussed here, a value Z(i) indicating the depth in the borehole of the top boundary of the layer in which the measurements (i) were made, the sonic log interval transit time $\Delta t(i)$ at that depth and the formation density log $\rho_B(i)$ at that depth. It is noted that in the example given here, the depth Z(i) is greater for greater values of the index (i), which is the reverse of the typical logs, which are obtained by starting the measurements at the bottom of the borehole. The log value sets L(i) indicated at 60 may be obtained by reversing, in a conventional manner, the order of the log value sets obtained with a borehole investigating device.

For the purpose of working with layers thicker than the typical six-inch layer for which the log value sets L(i) are provided, so as to reduce processing time and complexity, log value sets L(j) are derived at 64 as a function of the log value sets L(i). Referring to FIG. 8, where depth in the borehole increases downwardly, if the depth points (i) are spaced about six inches from each other, the depth points (j) may be spaced about six feet from each other, as indicated, so that the log value set L(1) is for the earth formation layer immediately below the point j=1, the log value set L(2) is for the layer immediately below the depth j=2, etc. As explained in the Summary, and as explained in greater detail in connection with FIG. 9a below, the index (j) refers to a point along a two-way traveltime axis, rather than to a point on the depth axis. Referring to FIG. 7, the log value set L(j) comprises a value Z(j) which indicates the depth of the top of the layer (j), a sonic log interval transit time value $\Delta t(j)$ indicating the average $\Delta t(i)$ values of the layers (i) which have been combined into a single layer (j), and a formation density log value $\rho_B(j)$ which is the average formation density of the layers (i) which have been combined into a single layer (j). The index (j) is again an integer ranging in value from 1 to J.

The dip value sets Dip(j) at 62 have been derived from a dipmeter of the type referenced above. Each dip value set Dip(j) comprises the value for the azimuth $\phi(j)$ and the dip $\theta(j)$ of the reflector which intersects the actual borehole at the depth point (j), as well as the azimuth $\phi'$ of the seismic section for which a synthetic seismogram is to be constructed in accordance with the invention. Another detailed description on how signals corresponding to Dip(j) can be derived from dipmeter measurements appears in Nederlof et al., A Three-dimensional vector method as an aid to continuous dipmeter interpretation, Geologie En Mijnbouw, Vol. 50(6), pp. 725-732.

An additional input is the location signal X(k) which denotes, referring to FIG. 4, the distance along the surface between the actual borehole and the virtual borehole (k), where (k) is an integer ranging in value from 1 to K, K being the number of the last virtual borehole of the seismic section selected for the synthetic seismogram to be derived in accordance with the invention.

The log value sets L(j), the dip signals Dip(j) and the location signals X(k) are combined to form log value sets L(m,k) which define the formation from the point (m) to the point (M+1) of the (k) virtual borehole, where (m) is a positive interger and is on a two-way traveltime scale. Referring to FIG. 8 for an illustration of an actual borehole and a virtual borehole intersected by the indicated reflectors, the earth formation layer immediately below the points j=1 and m=1 is the same, and so is the case with the earth formation layer immediately below the points j=2 and m=2. However, for the point at j=3, there is a reflector sloping downwardly, which intersects the virtual borehole at m=3. In accordance with the invention, such cases are treated by assigning the log value sets for the layer at j=3 to the earth formation layer at m=3. The log value sets at j=4 and j=5 are disregarded, on the assumption, in accordance with the invention, that the reflector at j=3 is of more recent origin and more important than the reflectors at j=4, and j=5. Note that any inaccuracies due to this assumption may be corrected later, in accordance with the invention, by the geological model procedure discussed below. The next reflector which intersects both the actual borehole and the virtual borehole is at point j=6 of the actual borehole and point m=4 of the virtual borehole. The log value set for the earth formation layer at j=6 of the actual borehole is given to the layer at point m=4 of the virtual borehole. The next reflector intersects the virtual borehole at point m=5, and the log value assigned to the layer at m=5 is the log value for the layer at j=8 of the actual borehole. Thus, referring to FIG. 7, the log value set L(m,k) comprises a depth value Z(m,k), which is the point at which (m) is on the two-way traveltime scale in the virtual borehole (k), a sonic log value $\Delta t(m,k)$ for the earth formation layer at (m) and a formation density log value $\rho_B(m,k)$ for the same layer (m) in the virtual borehole.

At 68 in FIG. 7, a new series of log value sets L(n,k) is generated from the log value sets L(m,k). Referring to FIG. 8, the virtual borehole is divided into layers (n) which are arranged along the two-way traveltime axis of the virtual borehole in the same manner as the layers (j) of the actual borehole (but note that this is an arbitrary choice, and the layers (n) may have different thickness, in traveltime units). In accordance with the invention: (1) if a point (n) coincides with a point (m), then the log value set L(m) is given to the layer at the corresponding point (n); otherwise (2) if there is a reflector within half an (n) layer on either side of the point (n), the log value set associated with the closest such reflector is given to the point (n); but if there is no such reflector, (3) the log value associated with the closest reflector above the point (n) is given to the layer at (n). In the example of FIG. 8, as indicated in the right-hand column thereof, the log value set for n=1 is the log value set for j=1; the log value set for n=2 is the log value set for j=2; the log value set for n=3 is the log value set for j=2; etc.

It is noted that if greater accuracy is desired and the processing time and expense are justified, a different approach may be taken for the cases where a reflector intersects a virtual borehole between two adjacent depth points (n) thereof. Referring to FIG. 8 for an example, a reflector intersects the illustrated borehole between the points n=4 and n=5. Rather than assign to each of the layers at n=4 and n=5 the log value set associated with point j=3, the value assigned to the layer at n=4 can be a weighted average of the log values for j=2 and j=3. This weighted average can be computed on the basis of the portion of the layer at n=4 above the reflector and the portion below the reflector. A similar case exists for the layer between points n=9 and n=10 of the virtual borehole, where the weighted average would be the average of the reflectors at j=9, j=10, j=11 and j=12 of the actual borehole, the weighting being based on the portion of the layer at n=9 corresponding to a specific one of the reflectors intersecting that layer.

The log value sets L(n,k) are synthetic logs for the virtual borehole (k). The resolution of the logs defined by the sets L(n,k) is lower than the resolution of the logs defined by the sets L(i), but this is primarily because the log value sets L(n,k) are derived from the log value sets L(j), rather than directly of the log value sets L(i). If greater resolution for the synthetic log values is desired, the principles on this invention can be applied to using the log value sets L(i) rather than the log value sets L(j) in the process of deriving the log value sets L(n,k).

If there is some knowledge of the earth formation which is being investigated in accordance with the invention, and it is desired to conform the results obtained through the invention to such geological model, the synthetic log value sets L(n,k) can be modified in accordance with the geological model. This geological model is based on assuming a lithology for all or a part of the formation of interest, and then providing log value sets L(g,n,k) based on this assumed lithology, where each log value set L(g,n,k) comprises the assumed geological model values for the relevant logs at the point Z(g,n) of the virtual borehole (k). If a geological model and log value sets based thereon are provided at 70, they may be used instead of the corresponding synthetic log value sets L(n,k) at 68. Note that there may be geological model sets L(g,n,k) for only some of the layers (n) in a given virtual borehole (k).

At 72 in FIG. 7, impedance values u(n,k) are derived from the synthetic log value sets L(n,k), where u(n,k) is the acoustic impedance value (synthetically derived) for the earth formation layer (n) of virtual borehole (k), this acoustic impedance value being derived in accordance with expression (2) given above. Again, if a geological model of the formation is assumed, assumed acoustic impedance values u(g,n,k) may be provided at 74, and used at 72 instead of the acoustic impedance values u(n,k).

At 76 in FIG. 7 the reflection coefficients R(n,k) are derived from the acoustic impedance values u(n,k) in accordance with expressions (3), (4), and (5) where the reflection coefficient R(n,k) can be any one, any two, or all three of the reflection coefficients r(n,k), r'(n,k) and r''(n,k) defined by expressions (3), (4), and (5) respectively. Again, if a geological model of the formation is assumed, and assumed reflection coefficients R(g,n,k) are provided at 78, the assumed reflection coefficients R(g,n,k) may be used in place of the corresponding computed reflection coefficients R(n,k) at 76.

At 80 in FIG. 7 the reflection coefficients R(n,k) derived at 76 may be combined with a selected input seismic signal waveform S(q) in accordance with expression (6) to form the seismogram trace signals f(n,k), which may be plotted at 66 to form the synthetic seismogram derived in accordance with the invention. Alternately, or additionally, the plot may include a plot of any of the reflection coefficients R(n,k), of the synthetic log value sets L(n,k), of the log value sets L(j), or any other of the signals derived in accordance with the invention.

Figure 9A:
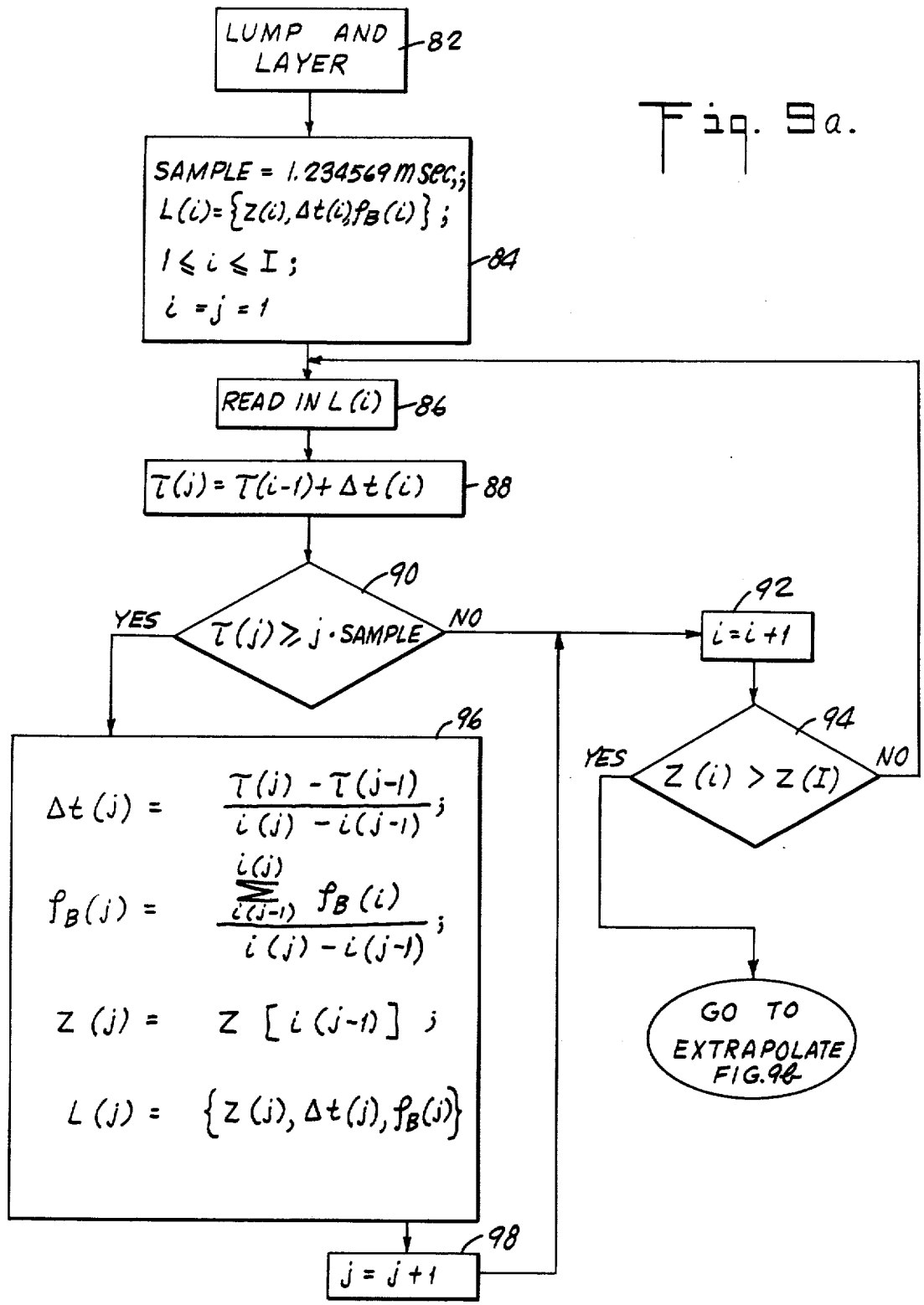

The process discussed generally in connection with FIG. 7 is illustrated in detail in FIGS. 9a through 9g, and starts at 82 with a procedure called LUMP AND LAYER whose purpose is to form the log value sets L(j) from the log value sets L(i). The inputs to the procedure of FIG. 9a are: (1) a signal called SAMPLE which is an arbitrarily selected time value, in this case 1.234569 seconds, and (2) the log value sets L(i) derived from the actual borehole by an investigating device. As will become apparent below, the value for SAMPLE determines the resolution of the log value sets L(j); a lesser value for SAMPLE means greater resolution and a higher value for SAMPLE means a lower resolution. The log value sets L(i) are reversely ordered with respect to the typical order in which they are derived by the borehole investigating device; that is, the first log value set L(i) at 60 is for the layer closest to the surface and the last set at 1=N is at the bottom of the actual borehole. The value of the index (i) ranges from 1 to I, where I corresponds to the bottom layer in the actual borehole. The index (j) is an integer, and both (i) and (j) start at 1.

At 86 in FIG. 9a the log value set L(i) corresponding to the current value of the index (i) is read in, and at 88 a value of $\tau(j)$ is computed in accordance with the indicated expression, to thereby represent the two-way traveltime of an acoustic signal between the surface and the top boundary of the layer (i). Note that in the exemplary embodiment of the invention discussed here, the sonic log interval transit time $\Delta t(i)$ is measured at six inch intervals along the actual borehole but the measured value is the time that a sonic signal takes to traverse one foot of the formation at that depth.

At 90 in FIG. 9a the value for the two-way traveltime $\tau(j)$ derived at 88 is compared with the value for SAMPLE multiplied by the current value of the index (j). If the answer at 90 is "no", meaning that the next depth point (j) has not been reached yet, the index (i) is incremented at 92, a test is made at 94 to see if the bottom of the actual borehole has been reached, and if the answer is "no", a return is made to step 86 to read in the next log value set L(i).

If the answer at 90 is "yes" meaning that a depth point (j) has been reached or exceeded, computations are made at 96 to form a log value set L(j), the index (j) is incremented at 98, and a return is made to 92. The log value sets L(j) is derived at 96 as follows: (1) the sonic log value $\Delta t(j)$ is the average sonic log value for the layers (i) forming the layer (j), in accordance with the indicated expression; (2) the formation density log $\rho B(j)$ is the average formation density log of the same layers (i) forming the layer (j), in accordance with the indicated expression; and (3) the depth Z(j) is the depth of the top boundary of the topmost layer (i) forming the layer (j). Of course, straight averaging is only one of several possible ways of deriving L(j) values, and other types of averaging may be used instead. Note that this procedure results in layers (j) whose thickness is the thickness through which a sound compressional wave would propagate in the time unit SAMPLE, and that (j) therefore is a point on a two-way traveltime axis extending downwardly in the actual borehole. Note also that the accuracy in forming the layers (j) is within the thickness of one layer (i).

Figure 9B:
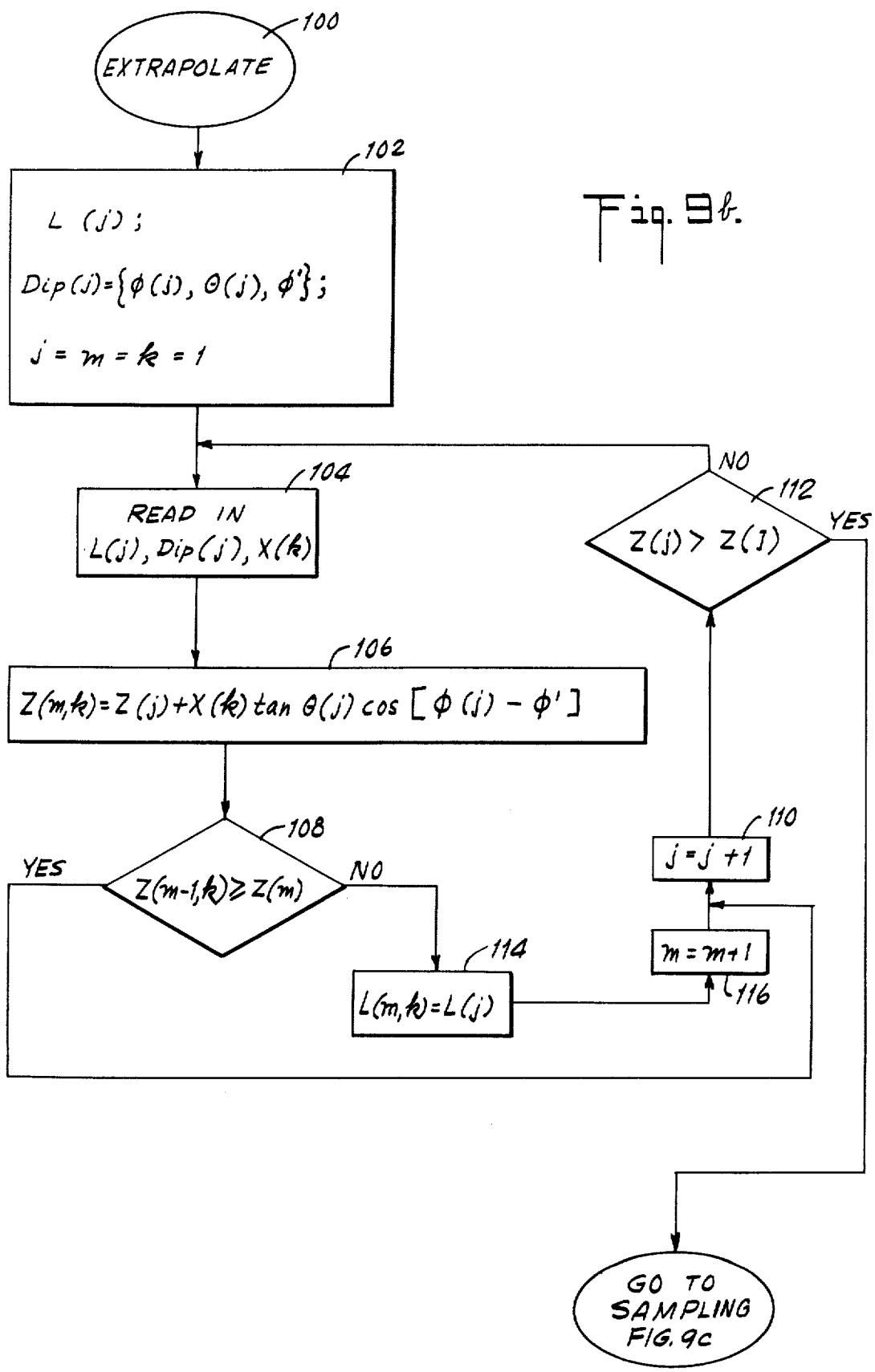

If the answer at step 94 is "yes", meaning that the lowermost layer (i) of the actual borehole has already been processed, a transfer is made to the procedure EXTRAPOLATE illustrated at FIG. 9b.

Referring to FIG. 9b, the purpose of the procedure EXTRAPOLATE is to form the log value sets L(m,k) discussed in connection with FIGS. 7 and 8. The procedure starts at 100 at FIG. 9b, and its starting signals are: (1) the log value signal sets L(j) derived at 96 in FIG. 9a; (2) the dip signal sets Dip(j) discussed in connection with FIGS. 6 and 7; and (3) the location signals X(k) discussed in connection with FIGS. 4 and 7. There are a total of K virtual boreholes, starting with virtual borehole 1, and each index (i), (m) and (k) is initially set to 1 at 102.

At 104 in FIG. 9b the log value set and the dip value set for layer (j) of the actual borehole are read in, and the location signal X(k) for the current value of (k) is read in. At 106, the depth Z(m,k) along the virtual borehole of the point (m) of the borehole (k) is derived in accordance with the indicated expression, and a test is made at 108 to see if the last depth Z(m−1,k) in the virtual borehole (k) derived in accordance with the expression at 106 is greater than or equal to the current depth Z(m,k). If the answer is "yes", this corresponds to the situation at point j=2 in FIG. 8, where the log value set L(j) associated with point j=4 is not used for any of the points (m) in the virtual borehole, and accordingly, a transfer is made to 110, where the index (j) is incremented in order to move to the next point (j) in the actual borehole, a test is made at 112 to see if the lowermost layer (j) in the actual borehole has been reached, and if the answer is "no", a return is made to 104.

If the answer at 108 is "no", corresponding to the situation where the reflector at the considered point (j) intersects the virtual borehole at a corresponding point (m) which is deeper in the virtual borehole than the previous point (m−1), the log value set for the point (j) is given to the corresponding point (m) (e.g., referring to FIG. 8 the log value set L(j) for point j=3 becomes the log value set L(m,k) for the point m=3 in virtual borehole (k) at 114). The index (m) is incremented at 116, and a return is made to 110. After all of the points (j) of the actual borehole have been processed in this manner, there is a log value set for each of the points (m) of the virtual borehole (k), and a transfer is made to the procedure SAMPLING illustrated at FIG. 9c.

Referring to FIG. 9c, the procedure is entered at 118, and the signals processed in it are the log value sets L(m,k) derived in the procedure illustrated at FIG. 9b. The purpose of the procedure is to derive the synthetic log value sets L(n,k) for each of the virtual boreholes (k). The procedure SAMPLING starts at 118 with the log value sets L(m,k) derived in the procedure EXTRAPOLE of FIG. 9b, and at 120 the value of a two-way traveltime $\tau(m,k)$ is set to 0 for each m=1, the index (n) is set to range from 1 to N, and each index (m) and (n) is set to an initial value of 1. At 122 the log value set L(m,k) corresponding to the current value of the index (m) for the current virtual borehole (k) is read in, and at 124 the two-way traveltime $\tau(m,k)$ is derived (this is the two-way traveltime between the surface and the top boundary of the layer (m) in virtual borehole (k), and is derived in accordance with the indicated expression).

At 126 a test is made if the current value of the two-way traveltime $\tau(m,k)$ is greater than or equal to the quantity SAMPLE multiplied by the current value of the index (n) decremented by 1. If the answer at 126 is "no", this is a situation of the type illustrated at points m=7 and m=8 in FIG. 8, where the log value sets for these points m=7 and m=8 are not used for any of the points (n). Thus, if the answer is "no" at 126, the index (m) is incremented at 128, a test is made at 130 to see if the depth of the virtual borehole under consideration has been exceeded, and if the answer is "no", a return is made to 122. If the answer at 126 is "yes", meaning that the current point (n) has not yet been assigned a log value set, a test is made at 132 to see if there is a point (m) within one-half a layer (n) of the current depth point (n) in the virtual borehole (k). If the answer is "no", meaning this corresponds to the example of the point n=3 at FIG. 8, and the current value of (m) is 3, the log value set which must be associated with point n=3 is the set L(2,k) for m=2. Accordingly, if the answer at 132 is "no", at 134 the log value set L(m−1,k) becomes the log value set L(n,k), the index (n) is incremented at 136, and a return is made to 126. If the answer at 132 is "yes", meaning a case such as at depth point n=2 or depth point n=4 in FIG. 8, the log value set L(m,k) for the current value of the index (m) is used as the log value set L(n,k), as set at 138, the index (n) is incremented at 140, and a return is made to 128.

When the answer at 130 is "yes", meaning that the bottom of the virtual borehole (k) has been reached, a test is made at 142 to see if there are still other virtual boreholes to be processed. If the answer is "yes", the index (k) is incremented at 144 and a return is made to the procedure EXTRAPOLATE illustrated at FIG. 9b, to process the next virtual borehole (k) in the same manner.

When the answer at 142 is "no", meaning that the last virtual borehole has been processed, tests are made at 146 and 148 to determine what the next procedure would be. The test at 146 determines if a plot of the synthetic log for the virtual borehole is desired, and if the answer is "yes", the synthetic logs for the virtual boreholes are plotted at 150. The test at 148 is whether there is a geological model, with geological model value sets which should replace some or all of the log value sets L(n,k). If the answer at 148 is "yes", a transfer is made to the procedure GEOMOD shown at FIG. 9d; and if the answer is "no" a transfer is made to the procedure RC shown at FIG. 9e.

Figure 9D:
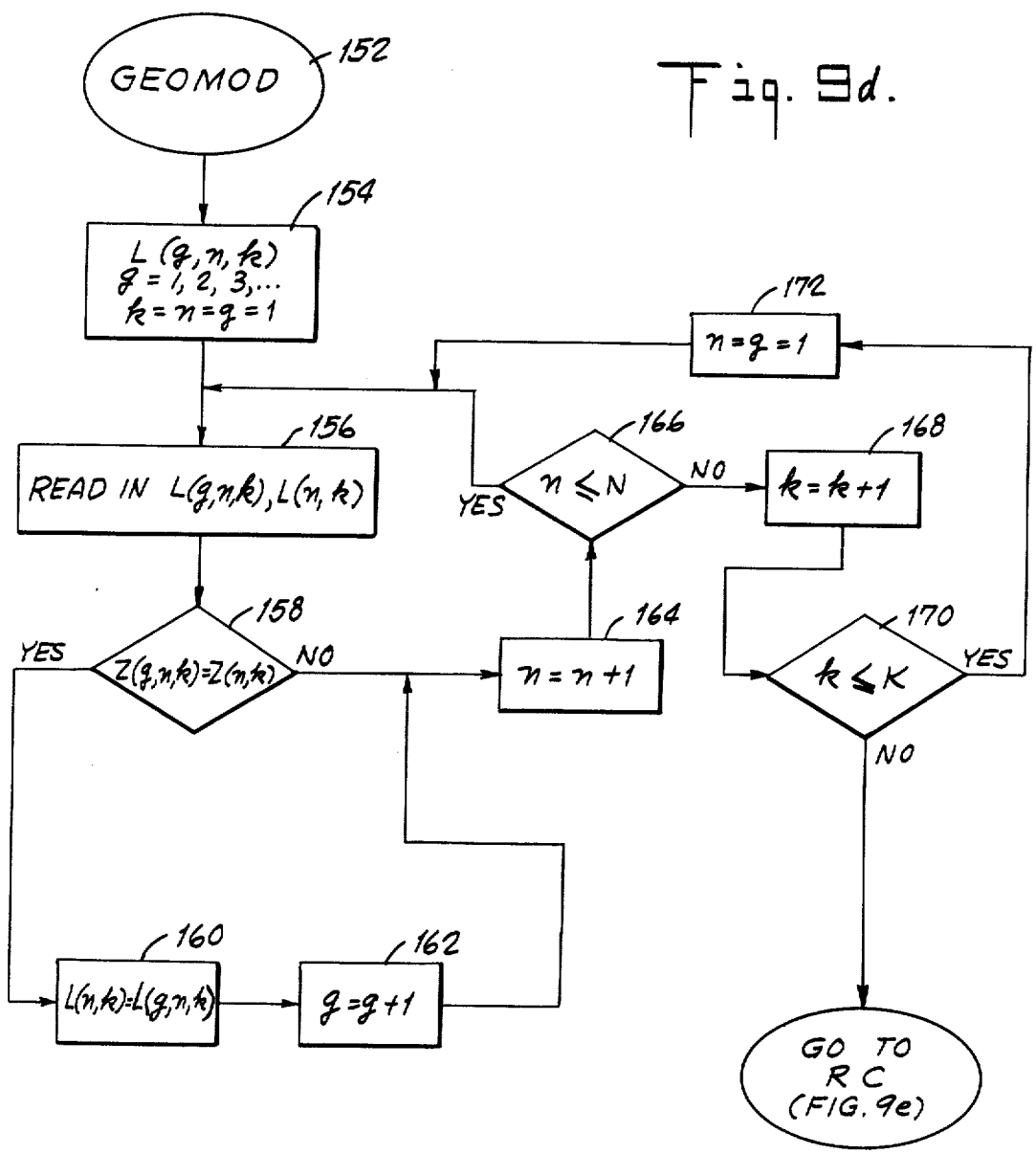

Referring to FIG. 9d, the purpose of the procedure GEOMOD is to substitute geological model log value sets L(g,n,k) for the corresponding log value sets L(n,k). The starting measurements for the procedure GEOMOD are, as indicated at 154 of FIG. 9d, one or more log value sets L(g,n,k), where the index (g) is a positive integer, and each index (k), (n), and (g) is initially set to 1. At 156 the log value set L(g,n,k) identified by the current values of the indices (g), (n), and (k) is read in, and so is the log value set L(n,k) identified by the same values of the indices (n) and (k), the log value set L(n,k) being derived in the procedure illustrated at FIGS. 9b and 9c. At 158 the depth of the log value set L(g,n,k) is compared with the depths of the value sets L(n,k) to see if there is a geological model log value set for that depth, and if the answer is "yes", the geological log value set L(g,n,k) is substituted for the existing log value set L(n,k) at 160, the index (g) is incremented at 162, the index (n) is incremented at 164, a test is made at 166 to see if the current value of (n) is still within the virtual borehole under consideration, and if the answer is "yes", a return is made to 156.

If the answer at 158 is "no", meaning that there is no geological model log value set for the current point (n) of the current virtual borehole (k), a transfer is made to 164 to proceed to the next layer (n). If the answer at 166 is "no", meaning that the current virtual borehole (k) has been processed, the value of (k) is incremented at 168 to start processing the next virtual borehole (k), a test is made at 170 to see if there are still virtual boreholes to be processed, and if the answer is "yes", the indices (n) and (g) are set to 1 at 172 and a return is made to 156 to start processing the next virtual borehole. If the answer at 170 is "no", meaning there are no more virtual boreholes to be so processed, a transfer is made to the procedure RC illustrated in FIG. 9e.

Figure 9E:
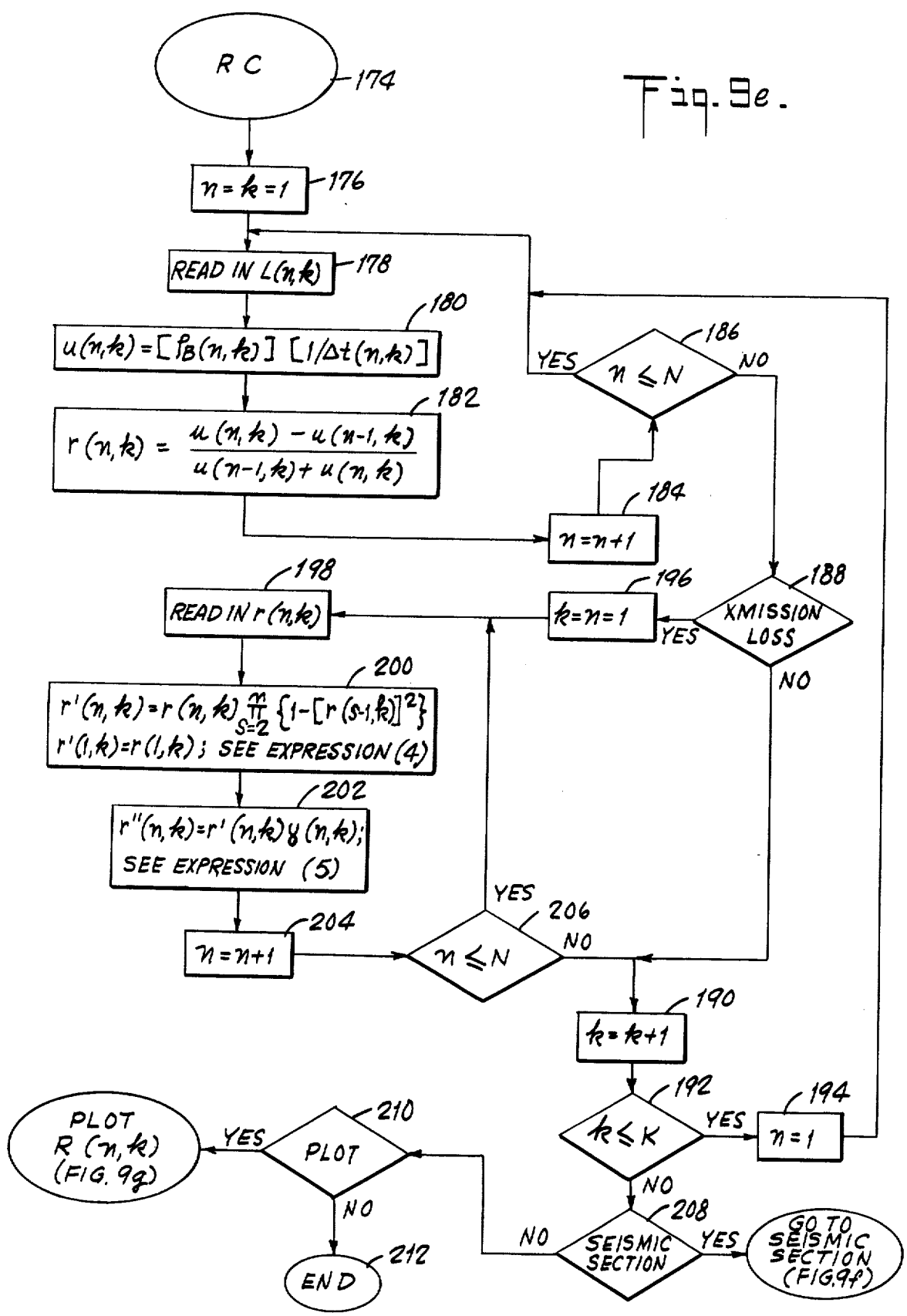

Referring to FIG. 9e, the purpose of the procedure RC is to derive the reflection coefficients r(n,k), r'(n,k) and r''(n,k) in accordance with the expressions (3), (4), and (5), based on the synthetic log value sets L(n,k).

The procedure RC starts at 174 with the synthetic log value sets L(n,k) derived as explained previously. The indices (n) and (k) are set to 1 at 176, and the log value set L(n,k) corresponding to the current value of the indices (n) and (k) is read in at 178.

The acoustic imedance u(n,k) for the layer identified by the current value of (n) and (k) is derived at 180 in accordance with the indicated expression, the ideal reflection coefficient r(n,K) is calculated at 182 in accordance with the indicated expression, the index (n) is incremented at 184, a test is made at 186 to see if the current value of (n) is still for a point within the current virtual borehole, and if the answer is "yes" a return is made to 178. When the answer at 186 is "no", this means that the ideal reflection coefficients r(n,k) for the entire current virtual borehole (k) have been calculated, and a test is made at 188 to see if it is desired to consider attenuation and transmission loss, i.e., if only the reflection coefficients r(n,k) are to be provided, or any of the other reflection coefficients r'(n,k) and r"(n,k) are to be considered as well. If the answer at 188 is "no", meaning that only the ideal reflection coefficients r(n,k) are of interest, the index (k) is incremented at 190, a test is made at 192 to see if any virtual boreholes remain to be processed, and if the answer is "yes", the index (n) is set to 1 at 194 to start processing the beginning of the next virtual borehole, and a return is made to 178.

If the answer at 188 is "yes", meaning that the reflection coefficients r'(n,k) and r"(n,k) are to be derived, which reflection coefficients take into account attenuation and transmission loss (as described above), the indices (k) and (n) are set to 1 at 196 to start processing the first virtual borehole, and the reflection coefficient r(n,k) determined by the current values of the indices (n) and (k) is read in at 198. The true amplitude reflection coefficient r'(n,k) is derived at 200 in accordance with the indicated expression (see expression (8) in the specification), and the amplitude restored reflection coefficient r"(n,k) is derived at 202 in accordance with the indicated expression (see expression (9) in the specification). The index (n) is then incremented at 204, a test is made at 206 to see if the current value of (n) is still within the virtual borehole under consideration, and if the answer is "yes", a return is made to 198. If the answer at 206 is "no", meaning that the current virtual borehole has been processed, a return is made to 190 to start so processing the next virtual borehole.

If the answer at 192 is "no" meaning that all virtual boreholes have been processed through the procedure RC, a test is made at 208 to see if it is desired to construct a synthetic seismogram. If the answer is "yes", a transfer is made to the procedure SEISMIC SECTION illustration at FIG. 9f, and if the answer is "no", a test is made at 210 to see if it is desired to plot the derived reflection coefficients. If the answer is "yes", a transfer is made to the procedure PLOT shown in FIG. 9g, to plot one or more of the three types of reflection coefficients R(n,k), and if the answer at 210 is "no", the process ends at 212.

Figure 9F:
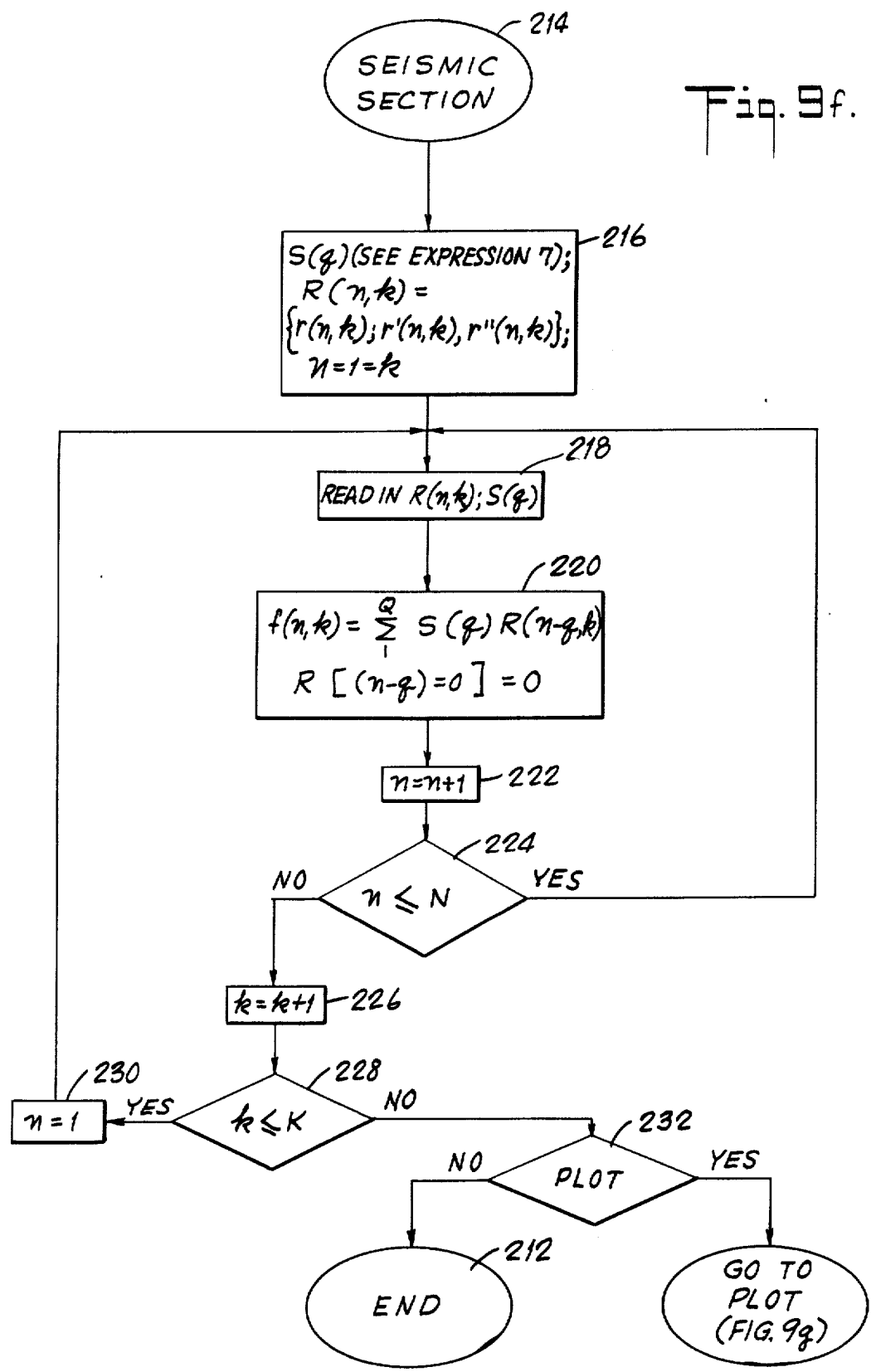

Referring to FIG. 9f, the purpose of the procedure SEISMIC section, which starts at 214, is to derive seismogram trace signals forming a synthetic seismogram of the seismic section defined by the virtual boreholes. As indicated at 216 at FIG. 9f, the starting measurements for the procedure SEISMIC SECTION are the signal S(q) defined in expression (7) in the specification and the reflection coefficients R(n,k), which may be any one, or any two, or all of the reflection coefficients r, r', and r", as derived in the procedure of FIG. 9e. The indices (n) and (k) are set to 1, to start at the top of the first virtual borehole, and at 218 the reflection coefficient or coefficients of interest and the signal S(q) are read in. The current value of the seismogram trace signal f(n,k) is derived at 220 in accordance with the indicated expression (see expression 6 above), the index (n) is incremented at 222, and a test is made at 224 to see if the current value of (n) is still within the virtual borehole under consideration. If the answer is "yes", a return is made to 218, but if the answer is "no", the value of (k) is incremented at 226, and a test is made at 228 to see if any more boreholes remain to be processed. If the answer at 228 is "yes", the index (n) is set to 1 to 230, so as to start at the beginning of the new virtual borehole, and a return is made to 218. If the answer at 220 is "no", meaning that all virtual boreholes have been processed through the procedure SEISMIC SECTION of FIG. 9(f), a test is made at 232 to see if a plot of the derived seismogram trace signals is desired. If the answer at 232 is "yes", a transfer is made to the procedure PLOT, and if the answer is "no", the process ends at 212.

Figure 9G:
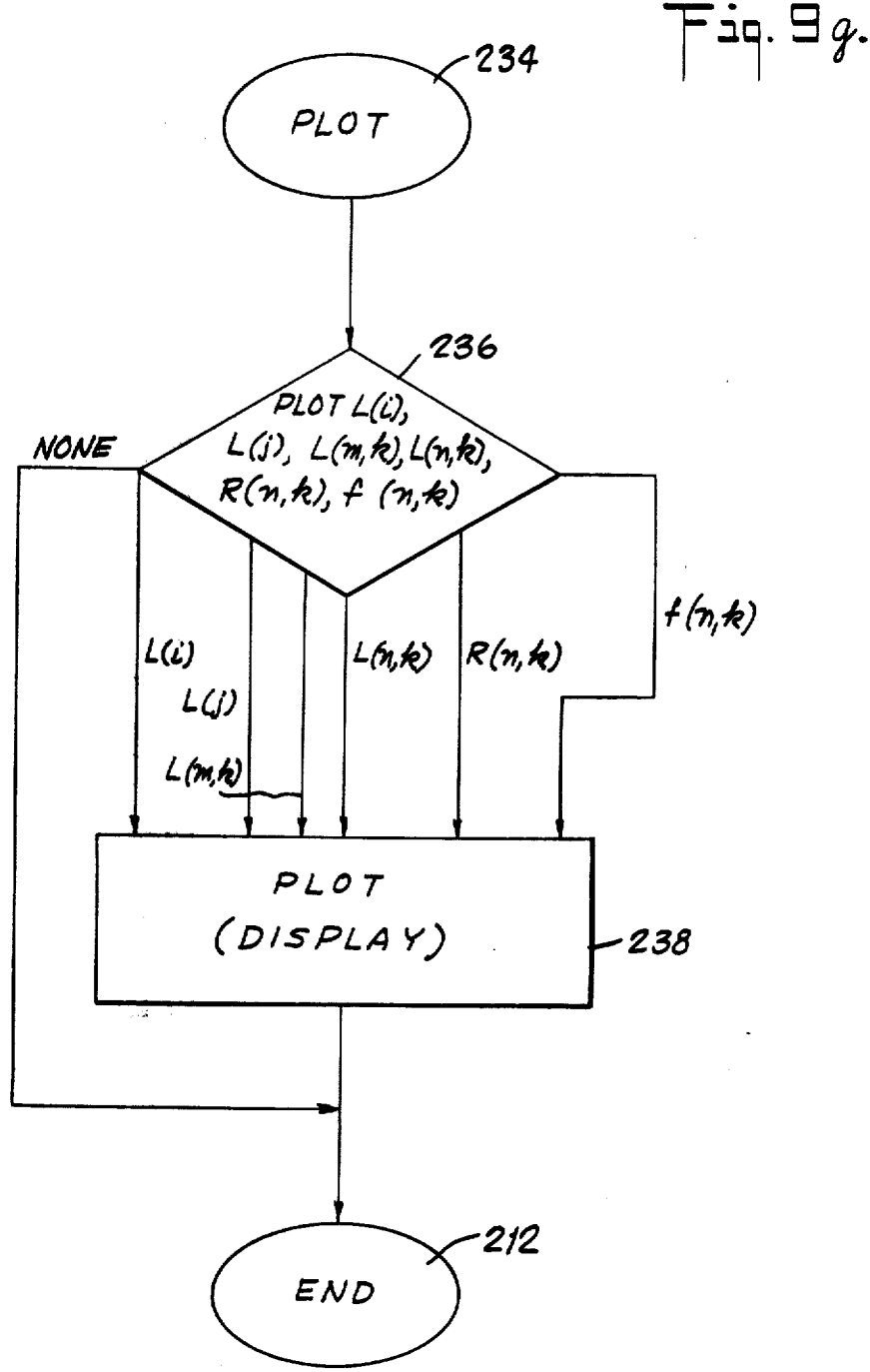

Referring to FIG. 9g, the procedure PLOT starts at 234, and a test is made at 236 to determine which of the derived log value sets, reflection coefficients and seismic trace signals are to be plotted. Depending on the choice made at 236, the selected values are plotted at 238 on a conventional plotter such as a VERSATEK multitrace plotter, or are displayed at a convention CRT display system. The process is then ended at 212.

The invention has been discussed in connection with FIGS. 7 and 9a through 9g as embodied in a process of deriving and combining log value set signals, dip signals and location signals so as to derive signals defining synthetic logs for virtual boreholes, signals defining reflection coefficients and signals defining a synthetic seismogram for a selected seismic section. This invented process can be carried out on a general purpose digital computer of conventional configuration and of sufficient size, such as an IBM System 360/65 or a DEC 10 system, or a different general purpose computer of similar capabilities. Each of the steps illustrated in FIGS. 9a through 9f can be expressed directly in a single statement of a higher level language, such as Fortran or PL/1, or at most a few such statements, but the steps have been designated in a notation which is believed easier to understand. For simplicity, the description of various ministerial tasks, such as reversing the order of the conventionally derived log value sets from an order which starts at the bottom of the borehole to an order which starts at the top of the borehole, or tasks such as designating memory areas for storing specific values, have been omitted.

Figure 10:
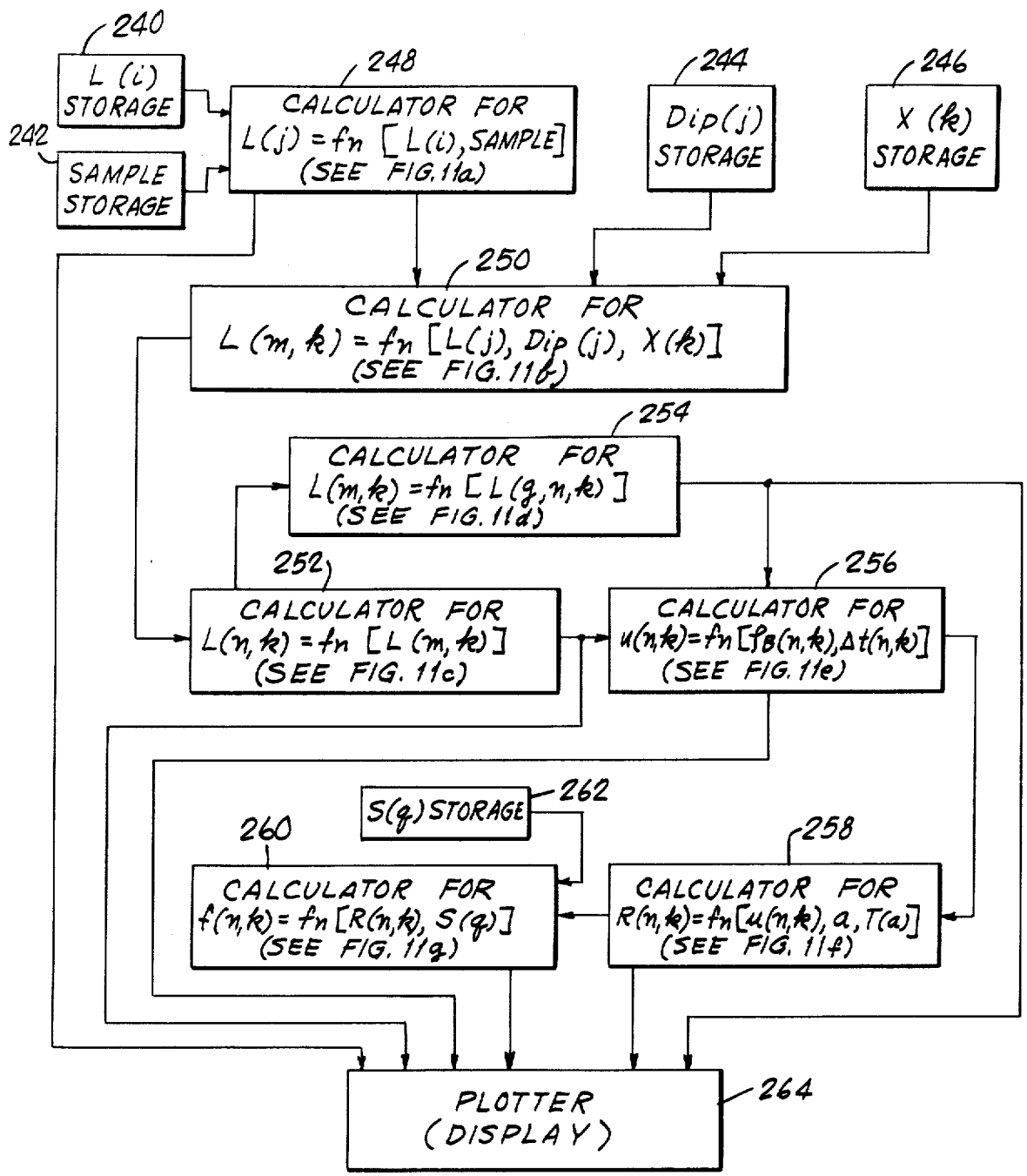
FIG. 10 is a block diagram of an alternate embodiment of the invention.

The invention may alternately be embodied in a special purpose machine, which may be either digital or analog. Referring to FIG. 10, one example of such special purpose machine embodying the invention comprises a storage device 240 for the log value sets L(i) derived from the actual borehole, a storage device 242 for the value of the constant SAMPLE discussed previously, a storage device 244 for the signals Dip(j) discussed previously, and a storage device 246 for the location signals X(k) discussed previously. Each of the storage devices 240 through 246 may be a tape recorder storing the relevant measurements in digital form. The log value signal sets L(i) from the storage device 240 are combined with the quantity SAMPLE in a calculator 248 to derive the log value signal sets L(j) discussed previously. The output of the calculator 248, i.e. the log value sets L(j), are combined with the dip signals Dip(j) from the storage device 244 and the location signals X(k) from the storage device 246 in a calculator 250 to derive the log value sets L(m,k) discussed previously.

The output of the calculator 250, i.e. the log value sets L(m,k), is used in a calculator 252 to derive the log value sets L(n,k) discussed previously, and some or all of the log value sets L(n,k) may be replaced by corresponding geological model log value sets L(g,n,k) in a calculator 254. The synthetic log value sets L(n,k), either from the calculator 252 or from the calculator 254, are used in a calculator 256 to derive the acoustic impedance values u(n,k), which are in turn used in a calculator 258 to derive one or more of the reflection coefficients R(n,k). The reflection coefficients R(n,k) derived in the calculator 258 are combined in a calculator 260 with the signal S(q) from a storage device 262 to derive the seismic trace signals f(n,k). A plotter 264, incorporating an appropriate input selector, may plot one or more of the following quantities: the log value sets L(j) from the calculator 248, the synthetic log value sets L(n,k) from either of the calculators 252 and 254, the acoustic impedance signals u(n,k) from the calculator 256, the reflection coefficient signals R(n,k) from the calculator 258 and the seismogram trace signals f(n,k) from the calculator 260.

Figure 11A:
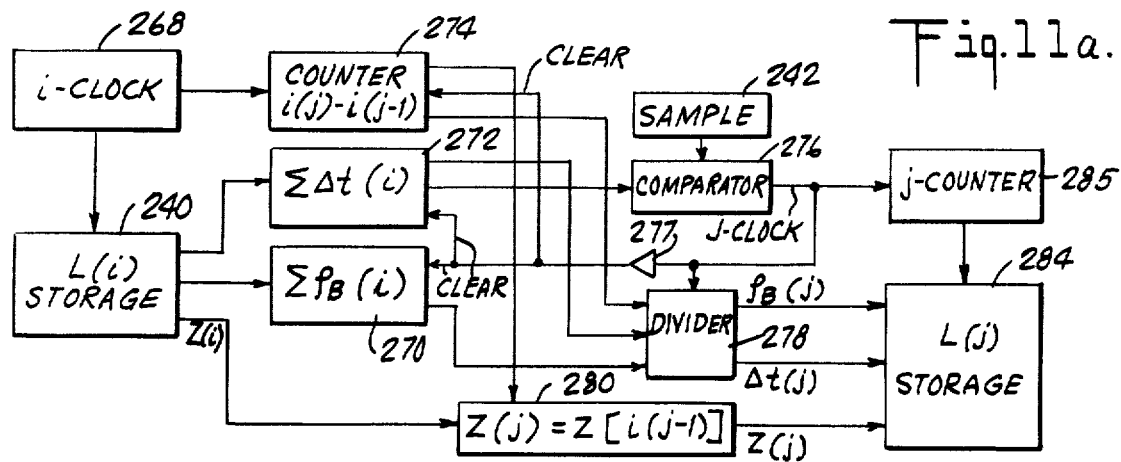
FIG. 11a through 11g are more detailed block diagrams of said alternate embodiment of the invention.

Referring to FIG. 11a for a more detailed description of the calculator 248, the storage device 240 stores the log value sets L(i) in digital form, and is advanced to the next (i) value in response to clock signals from an i-clock 268 to read off the next log value set L(i). The formation density log value $\rho_B(i)$ from the storage device 240 is applied to an accumulator 270 and the sonic log value $\Delta t(i)$ from the storage device 240 is applied to an accumulator 272, where the respective log values are accumulated until the accumulators are cleared by an appropriate clear signal. Concurrently, the number of clock signals is counted in a counter 274. The output of the accumulator 272 is compared in a comparator 276 with the output of the SAMPLE storage device 242, and when the output of the accumulator 272 is equal to or exceeds the quantity SAMPLE, the comparator 276 provides at its output a j-clock signal which enables a divider 278 to divide the current output of each of the accumulators 270 and 272 by the current contents of the i-counter 274, thereby providing at the output of the divider 278 the average value of the acoustic and formation density logs for the current value of (j). The same j-clock output of the comparator 276 is delayed slightly at 277 and is used to clear the contents of the accumulators 270 and 272 and of the counter 274 before the next log value set L(i) is read from the storage device 240. Thus, the outputs of the divider 278 are the sonic log and the formation density log portions of the log value set L(j). In order to obtain the Z(j) portion of the log value set L(j), each time the counter 274 is empty, a register 280 is enabled by an appropriate signal from the counter 274 to store the current value Z(i). The register 280 thus provides the L(j) storage device 284 with the needed value Z(j) which is stored therein in response to the same J-clock which clocks into the storage 284 the entire log value set L(j). A j-counter 285 is clocked by the j-clock output of comparator 276 and provides the storage 284 with the current value of the index (j).

Figure 11B:
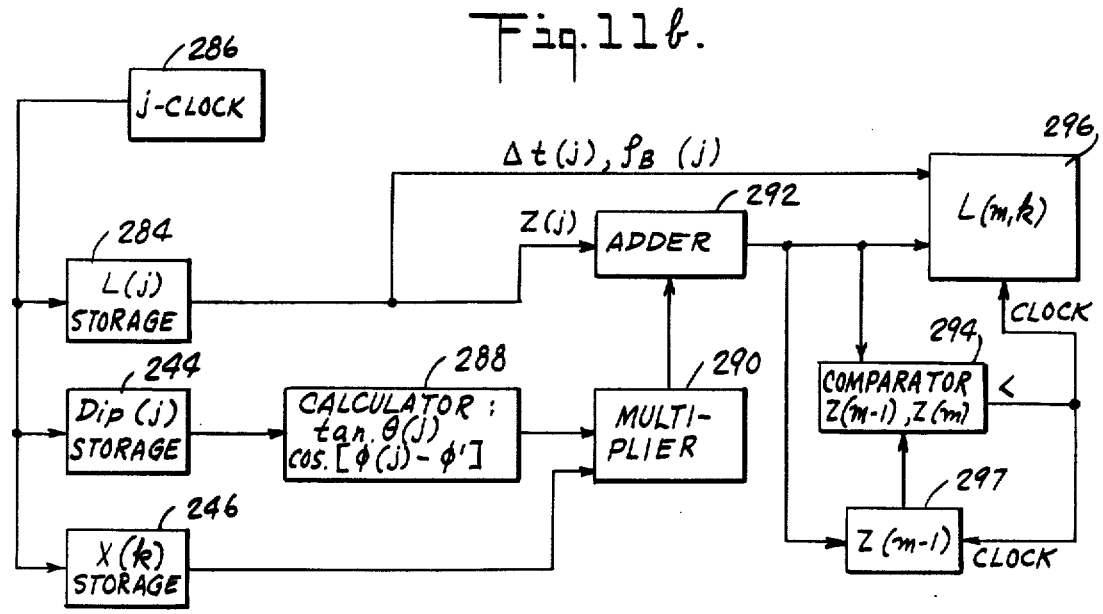

The calculator 250 of FIG. 10 is illustrated in greater detail in FIG. 11b, where the log value sets L(j) are stored in a storage device 284. A j-clock 286 advances the storage device 284 to read the next log value set L(j) and concurrently advances the storage device 244 to read the next value of the Dip(j) signal and causes the storage device 246 to provide the location signal X(k) of the current virtual borehole (k). A calculator 288 calculates a signal corresponding to the tangent of the current dip and the cosine of the azimuth of the current reflector minus the azimuth of the seismic section. The two quantities calculated at 288 are multiplied at a multiplier 290 with the signal X(k) from the storage device 246, which represents the distance between the actual borehole and the current virtual borehole under consideration. The output of the multiplier 290 is added to the current depth value Z(j) provided from the storage device 284 in an adder 292. A comparator 294 compares the current output of the adder 292 with the last output thereof (provided from a register 297), and if the last output is less than the current output, clocks the current output of the adder 292 into a storage device 296 as the depth value of the log value set L(m,k), and additionally clocks the sonic log and the formation density log values currently output from the storage device 284 into the storage device 296 as the remaining portion of the current log value set L(m,k). The output of the comparator 294 additionally clocks in the current output of the adder 292 into the register 297 for use as the "last" output for the next comparison in the comparator 294. After a full run through the log value sets L(j) stored in the storage device 284, the storage device 296 stores the log value sets L(m,k) for one virtual borehole. The storage device 246 is then updated to store the location signal X(k) for another virtual borehole, and a new run is made through the log value sets L(j) in the storage device 284, and so on, until all virtual boreholes have been processed and the storage device 296 stores a full set of the log value signals L(m,k) for all of the virtual boreholes of interest.

Figure 11C:
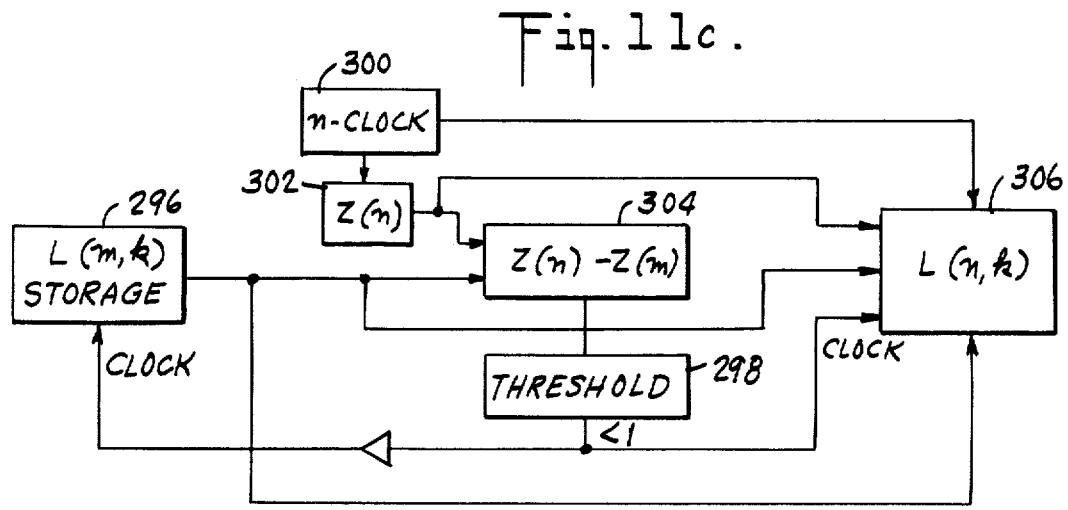

Referring to FIG. 11c, which illustrates in greater detail the calculator 252 of the FIG. 10, the starting signals are the log value sets L(m,k) stored in the storage device 296, which may be a tape recorder advanced by clock pulses from a threshold comparator device 298. An n-clock 300 clocks an accumulator 302 which provides at its output a depth value Z(n) corresponding to the accumulated value of clock pulses from the clock 300. The output of the accumulator 302 is compared in a subtractor 304 with the current depth value Z(m) of the current log value set L(m) from the storage device 296, and if the difference between the values compared at 304 is less than the difference between two adjacent Z(n) points, as determined by the threshold comparator 298, the comparator 298 outputs a clock pulse which enables a storage device 306 to store the current output of the device 302 as the depth value Z(n) of the current log value set L(n,k) and the current value of the sonic log and the formation density log portions of the current log value set L(m,k). The same clock output of the threshold comparator 298 is delayed slightly to allow for the appropriate storage in the device 306, and then advances the storage device 296 to read off the next log value sets L(m,k). After a complete run through the log value set in the storage device 296, the storage device 306 stores the log value sets L(n,k) for the virtual borehole under consideration. The remaining virtual boreholes are processed in the same manner, with the result that after all virtual boreholes have been so processed, the storage device 306 stores the log value sets L(n,k) for each of the boreholes defining the selected seismic section.

Figure 11D:
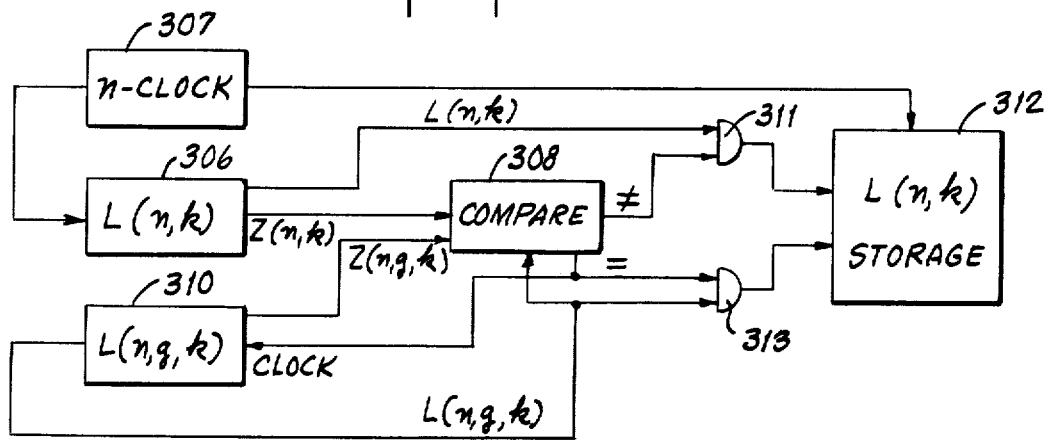

Referring to FIG. 11d which illustrates in greater detail the calculator 254, the storage device 306 stores the log value sets L(n,k) and is advanced by an n-clock 307 to read off the next log set value L(n,k), whose depth portion Z(n) is compared in a comparator 308 with the current depth value portion of the current geological model log value sets L(g,n,k) from a storage device 310. If the comparator 308 indicates lack of equality, an AND-gate 311 is enabled to store in the storage device 312 the current log value sets L(n,k) from the storage device 306. If the comparator 308 indicates that the compared quantities are equal, an AND-gate 313 is enabled to store in the storage device 312 the geological model log value set from the storage device 310 instead of the corresponding log value set from the storage device 306, and the storage device 310 is clocked to provide at its output the next geological model value set. After this is repeated for each virtual borehole, the storage device 312 stores a set of the log value L(n,k) which has been conformed to a geological model of the formation of interest.

Figure 11E:
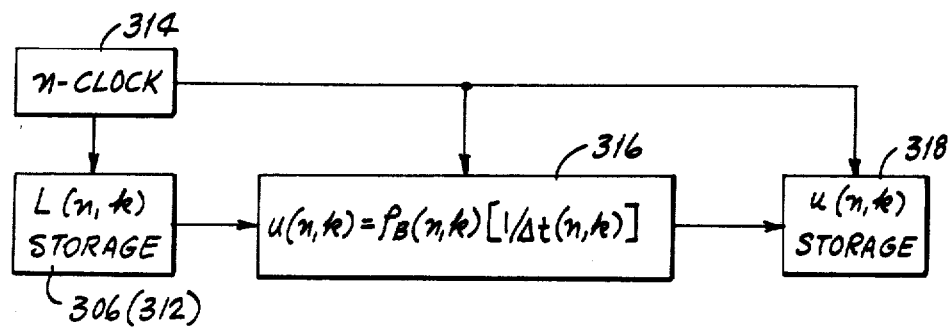

Referring to FIG. 11e which illustrates in greater detail the calculator 256, the starting signals are the log value sets L(n,k) either from the storage device 306 or from the storage device 312, and the storage device is advanced by pulses from an n-clock 314 to provide the next log value set L(n,k) to a calculator 316 that derives the acoustic impedance value u(n,k) in accordance with the indicated expression and stores it in a storage device 318. This is repeated for each of the virtual boreholes, with the result that the storage device 318 stores in succession the acoustic impedance values for the entire set of virtual boreholes forming the seismic section.

Figure 11F:
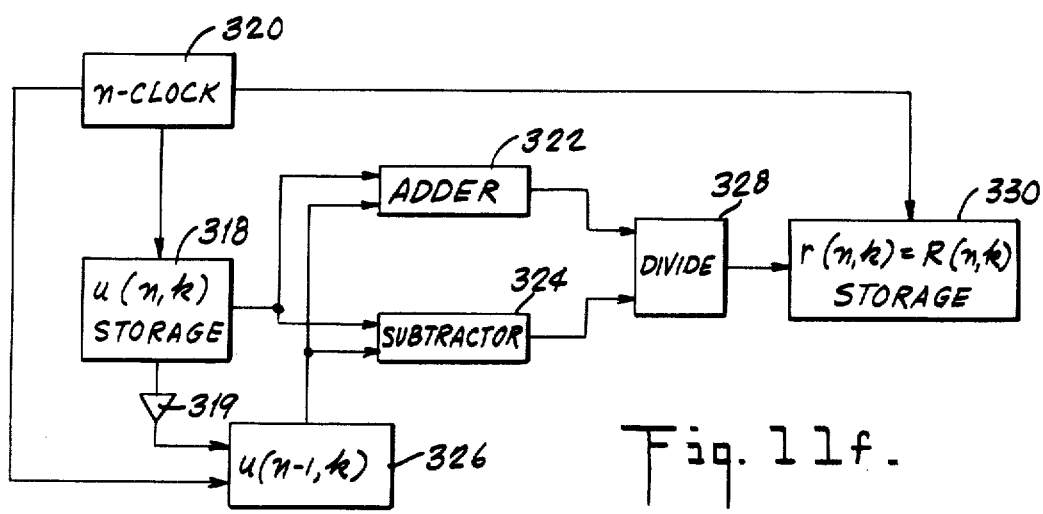

Referring to FIG. 11f which illustrates in greater detail the calculator 258, the starting signals are the acoustic impedance signals u(n,k) in the storage device 318, which is advanced by an n-clock 320 to provide the next acoustic impedance value signal to an adder 322 and a subtractor 324, and to provide its u(n,k) output to a register 326, but through a delay 319 with a delay of one clock period n. Thus, the output of the storage device 318 is the current value of the acoustic impedance, while the output of the register 326 is the last current acoustic impedance value. The subtractor 324 provides the numerator of expression (3) and the adder 322 provides the denominator of the same expression, both the numerator and the denominator being supplied to a divider 328 to calculate the value of the ideal reflection coefficient r(n,k), which is stored in a storage device 330. This may be repeated for each of the virtual boreholes (k). If desired, the reflection coefficients r' and r" may be calculated on the basis of the reflection coefficients r(n,k), by similar devices operating in accordance with expressions (4) and (5) given in this specification.

Figure 11G:
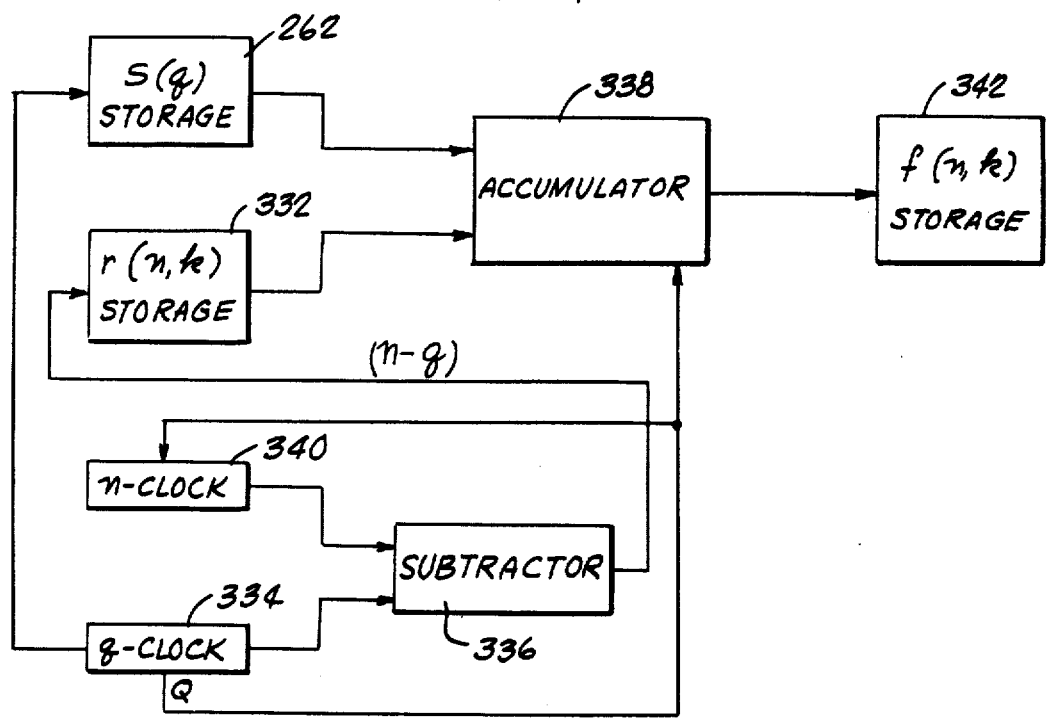

The calculator 260 and the storage device 262 of FIG. 10 are constructed and operate in accordance with expressions (6) and (7), and the plotter 264 may be any suitable multitrace plotter, or a CRT display system, plotting or displaying any of the indicated signals. Specifically, referring to FIG. 11g which shows the calculator 260 in greater detail, a S(q) storage device stores the Q samples of the waveform defined by expression (7), and a storage device 332 stores the N samples of the amplitude-restored reflection coefficient r for a borehole (k). A q-clock 334, which is a modulo-Q clock, runs through the Q samples, and a subtractor 336 provides the index (n-q) for addressing the r(n,k) storage 332 and applying the corresponding values S(q) and r(n-q,k) to an accumulator 338. Each time the q-clock 334 reaches Q, the n-clock 340 is incremented and the contents of the accumulator 338 are transferred to a f(n,k) storage device 342, thereby clearing the accumulator for the next f(n,k) value.

Each of the components discussed in connection with FIGS. 11a–11g is a standard digital logic component, of the type disclosed, for example, in Korn et al., Computer Handbook, McGraw-Hill, 1962. Since each of the referenced components carries out the indicated function in a conventional manner, and there is no novelty in any individual component, but only in the invented combination thereof, no detailed description need be given here of the make up of each individual component.

In summary, the invention starts with log and dip measurements derived with an investigating device passed through a borehole traversing an earth formation, and uses these log and dip measurements to derive synthetic log measurements for each of a plurality of virtual boreholes spaced from the actual borehole from which the original measurements are derived. The synthetic logs are in turn used to derive signals representing the acoustic impedance of the earth formation layers traversed by the virtual boreholes and the reflection coefficients (either with or without attenuation and transmission loss) for these earth formation layers. The signals representing the reflection coefficients are in turn combined with a signal representing a selected simulated input seismic signal to derive, for each virtual borehole, a seismogram trace signal corresponding to the seismogram trace for a virtual shotpoint coinciding with the virtual borehole, to thereby form a synthetic seismogram of a selected seismic section, which may or may not include the actual borehole, and which is truly two-dimensional, in that it takes into account the reflectors whose dip at the actual borehole has been actually measured with a borehole investigating device. If there is a geological model of the formation, and it is desired to conform the signals derived in accordance with the invention to that geological model, this may be done at various stages of the invention. For example, the synthetic logs for the virtual boreholes may be corrected in accordance with the geological model, the synthetic acoustic impedance signals for the virtual boreholes may be corrected in accordance with the geological model, or the reflection coefficient signals derived in accordance with the invention may be conformed to the geological model. (While only replacements by geological model by value set L(g,n,k) have been discussed expressly, similar replacements can be provided for the other geological model value sets illustrated in FIG. 7.) It is noted that the geological model is not restricted to a model of planar reflectors only, and that the signals derived in accordance with the invention may be conformed to any arbitrary geological model, including a model with dome-like or other non-planar reflectors. It is also noted that while the sonic and formation density logs have been discussed expressly in the example given above, any other suitable logs may be used in carrying out the invention. It is also noted that, as a variation of the invention, synthetic logs for the selected first virtual borehole may be derived from the log and dip measurements made in the actual borehole in the manner discussed in detail above, and then these synthetic logs for the first virtual borehole may be used in conjunction with arbitrarily selected dip values in the same manner as log and dip values of an actual borehole in deriving a synthetic log for a second selected virtual borehole, etc., the advantage of this variation being that the arbitrarily selected dip values for the virtual borehole used in generating a synthetic log for another virtual borehole may be selected such that a curved reflector is simulated. It is also noted that while only primary reflections have been expressly discussed above, multiple reflections may be similarly provided, by using in accordance with the invention the relationships discussed in Robinson, E.A., Multichannel Time Series Analysis with Digital Computer Programs, Holden-Day, 1967, see specifically Chapter 3, pp. 117-148.

An example of a synthetic seismogram derived in accordance with the invention is illustrated in FIG. 12, where two-way traveltime (and depth into the earth formation) increases downwardly, each downwardly extending synthetic seismogram trace corresponds to a virtual borehole, and dipping reflectors are clearly identifiable by the sloping laterally extending dark strips.

In the discussion above it has been assumed that the actual borehole is at least substantially vertical. While in real life situations boreholes rarely are perfectly vertical, it is well known in the art how to convert the well logging measurements derived from a nonvertical borehole to the measurements which would have been obtained from a vertical borehole originating at the same surface point. One such conversion technique involves spacing sample points regularly (e.g. at six inch intervals) along a vertical line originating at the borehole top, and finding a depth point on the actual borehole corresponding to each of said sample points, in accordance with the relationship $Z(b) = Z(a) \cos A$, where $Z(b)$ is the depth of a sample point along said vertical line, $Z(a)$ is the sought corresponding point on the actual borehole and $A$ is the angle of the actual borehole with respect to a vertical line at depth $Z(a)$. Once the correspondence is found, the actual or extrapolated well logging measurements for each depth point $Z(a)$ along the actual borehole are assigned to the corresponding depth point $Z(b)$ of the vertical line, and the resulting log value sets are used as the log value sets $L(i)$ discussed above. It should be clear in view of this that the log value sets $L(i)$ discussed above may be derived either from raw or from preprocessed well logging measurements. One example of such preprocessing is the conversion to true vertical depth discussed immediately above; other examples are various corelations and depths or other corrections of well logging measurements. With respect to the discussion above of locating and projecting laterally dipping reflectors, it should be noted that while a dipmeter of the referenced type may be used for locating and identifying such reflectors, reflectors of nonzero reflection coefficients may alternately be located and identified by the techniques discussed in copending applications Ser. No. 178,148, 178,129, 177,941, and 177,940 filed in September 1971. It should also be clear that various corrections may be made of signals derived in the course of practicing this invention if some knowledge exists as to what corrections may be appropriate. For example, if check-shot measurements are available from exploding one or more charges at different depths in the earth formation along a borehole and measuring the overall traveltime of the resulting sound compressional wave through a depth corresponding to the depth of the entire borehole or a selected portion thereof, this overall traveltime may be compared with the integral of the sonic log interval transit times $\Delta t(i)$ or $\Delta t(j)$ derived as discussed above. If any difference exists, each of the sonic logs interval transit times may be corrected proportionately.

In conclusion, the invention is capable of generating accurate measurements for portions of an earth formation which are removed by substantial distances from an actual borehole even in the case of formations including dipping reflectors and even in cases where no geological models of the formation are available. These measurements, and particularly the synthetic logs and the two-dimensional synthetic seismograms derived in accordance with the invention are invaluable tools in exploring earth formations for valuable underground resources.

We claim:

1. A method of exploring a subsurface earth formation comprising the steps of:
   providing log and dip signals derived from an investigating device passed through an actual borehole traversing the earth formation;
   providing location signals characterizing the spatial relationship between the actual borehole and a two-dimensional seismic section of the earth formation, said seismic section having a dimension in a direction transverse to the borehole which is orders of magnitude greater than the borehole diameter; and
   automatically combining said log, dip, and location signals in automatic signal processing means to provide signals defining a synthetic seismogram of said two-dimensional seismic section.

2. A method as in claim 1 wherein the combining step comprises the substeps of:
   combining said log, dip, and location signals to provide synthetic log signals for each of a plurality of virtual boreholes in the plane of said seismic section;
   combining the synthetic log signals to provide synthetic acoustic impedance signals characterizing the earth formation adjacent each virtual borehole;
   combining the acoustic impedance signals to provide reflection signals characterizing earth formation reflectors traversed by each virtual borehole; and
   combining the reflection signals with a signal defining a selected input seismic signal to provide signals defining a synthetic seismogram trace for each of said virtual borehole, said synthetic seismogram trace signals forming said synthetic seismogram of the seismic section.

3. A method as in claim 2 including the steps of providing signals characterizing a selected geological model of the earth formation and modifying said combining step in accordance with the geological model signals.

4. A method as in claim 2 wherein the substep of providing reflection signals comprises at least one of the sub-substeps of providing reflection signals corresponding to a reflected seismic signal whose amplitude is fully restored, providing reflection signals corresponding to a reflected seismic signal whose amplitude is not restored, and providing reflection signals corresponding to a reflected seismic signal whose amplitude is restored to an arbitrarily selected degree.

5. A method as in claim 1 wherein the combining step includes the substep of providing synthetic log signals for each of a plurality of virtual boreholes coinciding with the plane of said seismic section.

6. A method as in claim 1 wherein the combining step includes the substep of providing acoustic impedance signals characterizing the earth formation adjacent each of a plurality of virtual boreholes coinciding with the plane of the seismic section.

7. A method as in claim 1 wherein the combining step includes the substep of providing, for each of a plurality of virtual boreholes coinciding with said seismic section, signals characterizing the reflection of a seismic signal from formation reflectors traversing the virtual borehole.

8. A method as in claim 7 wherein said reflection signals comprise signals characterizing the amplitude restored reflections of a seismic signal from said reflectors, signals characterizing the unrestored amplitude seismic signal reflections from said reflectors and signals characterizing the partially restored amplitude seismic signal reflections from said reflectors, said partial restoration being to an arbitrarily selected degree.

9. A method as in claim 7 wherein the step of providing said reflection signals comprises the substep of providing signals defining the amplitude restored reflections from said reflectors.

10. A method as in claim 7 wherein the step of providing said reflection signals comprises at least one of the substeps of providing signals characterizing the amplitude restored reflections from said reflectors, providing signals characterizing the unrestored amplitude reflections from said reflectors and providing signals characterizing the reflections from said reflectors which are restored in amplitude to an arbitrarily selected degree.

11. A method as in claim 1 including the step of providing signals characterizing a selected geological model of the formation, and wherein the combining step includes the substep of conforming the synthetic seismogram signals to said geological model signals.

12. A method as in claim 1 wherein the log signals include sonic and formation density log signals of the formation adjacent the actual borehole.

13. A method as in claim 1 including the step of providing a visual display of said synthetic seismogram signals.

14. A method as in claim 1 wherein said seismic section is spaced from the actual borehole.

15. A method of exploring a subsurface earth formation comprising the steps of:
providing log and dip signals derived from an investigating device passed through an actual borehole traversing the earth formation, and providing location signals defining the spatial relationship between said actual borehole and a virtual borehole spaced therefrom; and
automatically combining said log, dip, and location signals in automatic signal processing means to provide synthetic log signals characterizing the earth formation adjacent said virtual borehole.

16. A method as in claim 15 including the step of combining said synthetic log signals to provide signals characterizing the impedance of the earth formation adjacent said virtual borehole.

17. A method as in claim 16 including the step of combining said impedance signals to provide signals characterizing earth formation reflectors traversed by said virtual borehole.

18. A method as in claim 17 including the step of combining said reflection signals with a signal characterizing a selected input seismic signal to provide signals defining a seismogram trace for a shotpoint coinciding with said virtual borehole.

19. A method as in claim 18 including the step of providing signals characterizing a selected geological model of the earth formation and conforming the signals characterizing the earth formation adjacent said virtual borehole to said geological model signals.

20. A method as in claim 15 including the step of combining said synthetic log signals to provide signals characterizing earth formation reflectors traversed by the virtual borehole.

21. A method as in claim 15 including the step of combining said synthetic log signals to provide signals defining a seismogram trace for a shotpoint coinciding with said virtual borehole.

22. A method as in claim 15 including the step of providing additional location signals defining the locations of a plurality of additional virtual boreholes of said earth formation, and wherein the combining step includes combining said additional location signals to provide synthetic log signals for each of the additional virtual boreholes.

23. A method as in claim 22 including combining said additional synthetic log signals to provide, for each of said additional virtual boreholes, signals defining the reflections of a seismic signal from reflectors traversing said virtual boreholes.

24. A method as in claim 22 including the step of providing a synthetic seismogram trace for each of said virtual boreholes.

25. A method of exploring a subsurface earth formation comprising the steps of:
providing log and dip signals determined by the earth formation adjacent an actual borehole traversing the formation and providing location signals characterizing the location of a virtual borehole; and
automatically combining said log, dip, and location signals in automatic signal processing means to provide signals characterizing the points at which the reflectors traversing the actual borehole traverse the virtual borehole and characterizing the earth formation layers associated with each reflector traversing the virtual borehole, to thereby form a partial set of synthetic log signals characterizing the earth formation adjacent the virtual borehole.

26. A method as in claim 25 wherein the step of providing log signals comprises the substeps of:
providing log signals each characterizing properties of the earth formation adjacent each of a plurality of regularly spaced points along the actual boreholes; and
combining the last recited log signals to provide a second set of log signals each characterizing the properties of an earth formation layer adjacent the actal borehole and having a thickness corresponding to the thickness through which a seismic signal propagates for a unit time, said second set of log signals being combined to provide said partial synthetic log signals.

27. A method as in claim 26 including the step of combining said partial synthetic log signals to provide a full set of synthetic log signals, each synthetic log signal of said full set characterizing the properties of a different earth formation layer adjacent the virtual borehole and having a thickness corresponding to the thickness through which a seismic signal propagates in a unit time at the depth in the virtual borehole corresponding to the last recited synthetic log signal.

28. A system for exploring a subsurface earth formation comprising:

means for providing log and dip signals from an investigating device passed through an actual borehole traversing the earth formation;

means for providing location signals characterizing the spatial relationship between the actual borehole and a two-dimensional seismic section of the earth formation; and automatic means for combining said log, dip, and location signals to provide signals defining a synthetic seismogram of said seismic section.

29. A system as in claim 28 wherein the combining means comprise:

means for combining said log, dip, and location signals to provide synthetic log signals for each of a plurality of virtual boreholes in the plane of said seismic section;

means for combining the synthetic log signals to provide synthetic acoustic impedance signals characterizing the earth formation adjacent each virtual borehole;

means for combining the acoustic impedance signals to provide reflection signals characterizing earth formation reflectors traversed by each virtual borehole; and means for combining the reflection signals with a signal defining a selected input seismic signal to provide signals defining a synthetic seismogram trace for each of said virtual boreholes, said synthetic seismogram trace signals forming said synthetic seismogram of the seismic section.

30. A system as in claim 29 including means for providing signals characterizing a selected geological model of the earth formation and means for modifying signals derived by said combining means in accordance with the geological model signals.

31. A system as in claim 28 wherein the combining means include means for providing synthetic log signals for each of a plurality of virtual boreholes coinciding with the plane of said seismic section.

32. A system as in claim 28 wherein the combining means include means for providing acoustic impedance signals characterizing the earth formation adjacent each of a plurality of virtual boreholes coinciding with the plane of the seismic section.

33. A system as in claim 28 wherein the combining means include means for providing, for each of a plurality of virtual boreholes coinciding with said seismi section, signals characterizing the reflection of a seismic signal from formation reflectors traversing the virtual borehole.

34. A system as in claim 28 including means for providing signals characterizing a selected geological model of the formation and means for conforming the synthetic seismogram signals to said geological model signals.

35. A system as in claim 28 including means for providing a visual display of said synthetic seismogram signals.

36. A system for exploring a subsurface earth formation comprising:

means for providing log and dip signals derived from an investigating device passed through an actual borehole traversing the earth formation, and for providing location signals defining the spatial relationship between said actual borehole and a virtual borehole spaced therefrom; and automatic means for combining said log, dip, and location signals to provide synthetic log signals characterizing the earth formation adjacent said virtual borehole.

37. A system as in claim 36 including means for combining said synthetic log signals to provide signals characterizing the impedance of the earth formation adjacent said virtual borehole.

38. A system as in claim 37 including means for combining said impedance signals to provide signals characterizing earth formation reflectors trversed by said virtual borehole.

39. A system as in claim 38 including means for combining said reflection signals with a signal characterizing a selected input sesmic waveform to provide signals defining a seismogram trace for a shotpoint coinciding with said virtual borehole.

40. A system as in claim 39 including means for providign signals characterizing a selected geological model of the earth formation and for conforming the signals characterizing the earth formation adjacent said virtual borehole to said geological model signals.

41. A system as in claim 36 including means for combining said synthetic log signals to provide signals characterizing earth formation reflectors traversed by the virtual borehole.

42. A system as in claim 36 including means for combining said synthetic log signals to provide signals defining a seismogram trace for a shotpoint coinciding with said virtual borehole.

43. A system as in claim 36 including means for providing additional location signals defining the locations of a plurality of additional virtual boreholes of said earth formation, and for combining said additional location signals to provide synthetic log signals for each of the additional virtual boreholes.

44. A system for exploring a subsurface earth formation comprising:

means for providing log and dip signals characterizing the earth formation adjacent an actual borehole traversing the formation and for providing location signals characterizing the location of a virtual borehole spaced from the actual borehole; and automatic means for combining said log, dip, and location signals to provide signals characterizing the points at which the reflectors traversing the actual borehole traverse the virtual borehole and characterizing the earth formation layers associated with each reflector traversing the virtual borehole, to thereby form a partial set of synthetic log signals characterizing the earth formation adjacent the virtual borehole.

45. A system as in claim 44 wherein the means for providing log signals comprises:

means for providing log signals each characterizing selected properties of the earth formation adjacent each of a plurality of regularly spaced depth points of the actual boreholes; and means for combining the last recited log signals to provide a second set of log signals each characterizing the properties of an earth formation layer adjacent the actual borehole and having a thickness corresponding to the thicknessthrough which a seismic signal propagates in a unit time at the depth thereof, said second set of log signals being combined to provide said partial set of synthetic log signals.

46. A system as in claim 45 including means for combining said partial set of synthetic log signals to provide a full set of synthetic log signals, each synthetic log signal of said full set characterizing properties of a different earth formation layer adjacent the virtual borehole and having a thickness corresponding to the thickness through which a seismic signal propagates in a unit time at the depth in the virtual borehole corresponding to the last recited synthetic log signal.

* * * * *